(12) United States Patent
Dobney

(10) Patent No.: US 12,738,573 B2
(45) Date of Patent: Sep. 15, 2026

(54) ELECTROCHEMICAL DEVICE, SYSTEM, AND METHOD

(71) Applicant: David Timothy Dobney, Toronto (CA)

(72) Inventor: David Timothy Dobney, Toronto (CA)

( * ) Notice: Subject to any disclaimer, the term of this patent is extended or adjusted under 35 U.S.C. 154(b) by 524 days.

(21) Appl. No.: 18/226,258

(22) Filed: Jul. 26, 2023

(65) Prior Publication Data

US 2025/0038315 A1 Jan. 30, 2025

(51) Int. Cl.

*H01M 50/112* (2021.01)
*H01M 50/581* (2021.01)
*H01M 50/583* (2021.01)
*H01M 50/618* (2021.01)
*H01M 50/636* (2021.01)
*H01M 50/673* (2021.01)

(52) U.S. Cl.

CPC ....... *H01M 50/112* (2021.01); *H01M 50/581* (2021.01); *H01M 50/583* (2021.01); *H01M 50/618* (2021.01); *H01M 50/636* (2021.01); *H01M 50/673* (2021.01)

(58) Field of Classification Search

None

See application file for complete search history.

(56) References Cited

U.S. PATENT DOCUMENTS

2006/0204838 A1* 9/2006 Bobrik ................ H01M 14/005 429/105

* cited by examiner

*Primary Examiner* — Colin W. Slifka
(74) *Attorney, Agent, or Firm* — HEER LAW; Christopher D. Heer

(57) ABSTRACT

The present specification relates generally to electrochemical energy production and storage, and more specifically to an electrochemical device system and method of using an electrochemical device system.
The electrochemical device system may include at least two concentration cells that exchange heat with each other.
The electrochemical device system may include a concentration cell wherein in a first cycle the first compartment is a cathode compartment while the second compartment is an anode compartment and wherein in a second cycle the second compartment is a cathode compartment while the first compartment is an anode compartment.
A method of using an electrochemical device system may include vapourizing solution, collecting condensate, causing the condensed solvent and the heated solution to be in contact with a first side and second side of an ion transferer, extracting electrical energy via electrodes, subsequently operating with reversed function of electrodes.

19 Claims, 28 Drawing Sheets

FIG. 11

ELECTROCHEMICAL DEVICE, SYSTEM, AND METHOD

CROSS REFERENCE TO RELATED APPLICATION

This application claims priority from U.S. provisional patent application Ser. No. 63/393,917 filed Jul. 31, 2022, the entirety of which is incorporated herein by reference.

FIELD OF THE INVENTION

The present specification relates generally to electrochemical energy production and storage, and more specifically to an electrochemical device system and method of using an electrochemical device system.

BACKGROUND OF THE INVENTION

In US20060204838A1, Bobrik and Austreng describe a solar driven concentration cell that comprises one anode compartment (0105) and one cathode compartment (0102). A concentration gradient is generated by solar heating and the concentration gradient is used to generate electricity by the principle of the concentration cell (a limited form of a galvanic cell that has two equivalent half-cells of the same composition differing only in concentrations). To generate a concentration gradient, solvent evaporates from one half-cell, condenses on the lid of the device, and flows to the other half-cell. During condensation, a significant amount of heat is lost to the environment, reducing the efficiency of the device (i.e.—the ratio of electrical energy generated per unit of heat delivered is relatively low). Furthermore, the cost to construct the invention relative to the rate of electrical power generatable is relatively high. Also, the method of maintaining electrodes is cumbersome.

In U.S. Pat. No. 4,292,378A, Krumpelt and Bates describe a relatively high temperature concentration cell that regenerates anolyte and catholyte of the concentration cell by employing an external distillation system. During distillation, a significant amount of heat is lost to the environment. The cost to construct the invention relative to the rate of electrical power generatable is relatively high. Operation at high temperature necessitates expensive materials of construction and relatively high heat losses. Also, the method of maintaining electrodes is cumbersome.

In U.S. Pat. No. 4,410,606A, Loutfy, Brown, and Yao describe a thermally regenerative electrochemical system including an electrochemical cell with two water-based electrolytes separated by an ion exchange membrane, at least one of the electrolytes containing a complexing agent. The invention regenerates anolyte and catholyte of the concentration cell by employing an external distillation system. During distillation, a significant amount of heat is lost to the environment. The cost to construct the invention relative to the rate of electrical power generatable is relatively high. Also, the method of maintaining electrodes is cumbersome.

In U.S. Pat. No. 3,231,426A, Ludwig and Roulette describe a concentration cell, with one anode and one cathode, wherein thermal energy is converted into electrical energy. A concentration difference is generated by application of heat, evaporation of solvent from a heat source adjacent to one electrode, and condensation/transfer of solvent to the other electrode due to adjacent cooling. Furthermore, the invention employs capillary action to promote distribution of solvent. The invention employs fins or water cooling for condensation, and all heat of condensation is lost to the ambient, resulting in low thermal to electrical conversion efficiency. The cost to construct the invention relative to the rate of electrical power generatable is relatively high. Also, the method of maintaining electrodes is cumbersome.

In U.S. Pat. No. 3,540,934A, Boeke describes a multiple redox battery comprising a number of redox cells, each having cathode and anode chambers, electrical conducting means connecting said cells in series, a catholyte regenerator, an anolyte regenerator. The invention employs external regenerators that employ consumable streams, namely reducing fuel and consumable oxidizer to achieve regeneration. Use of consumable streams for regeneration is costly, and availability of consumable streams affects feasibility and economic viability. The cost of the regenerators also affects economic viability. Also, the method of maintaining electrodes is cumbersome.

In U.S. Pat. No. 3,522,101A, Baker describes a power module including thermally regenerative battery and fuel cell and method of operation. The invention employs waste heat (or external electrical current) to regenerate anolyte and catholyte of a concentration cell with one anode and one cathode. During regeneration, a significant amount of heat is lost to the environment. The cost to construct the invention relative to the rate of electrical power generatable is relatively high. Operation at high temperature necessitates expensive materials of construction and relatively high heat losses. Also, the method of maintaining electrodes is cumbersome.

In 'Thermally Regenerative Electrochemical Cycle for Low-Grade Heat Harvesting', ACS Energy Letters, 31 Aug. 2017, Gao, Lee, Yang (DOI: 10.1021/acsenergylett.7b00568), a thermally regenerative electrochemical cycle (TREC) device is presented. The CuHCF TREC device charges at high temperature and is discharged at low temperature. The TREC device operates at low efficiency and is expensive to construct.

'Thermally Regenerative Electrochemical Cycle for Low-Grade Heat Harvesting' also describes a TREC system using an ammonia-based battery demonstrated by the Logan group of Pennsylvania State University. An electrical potential difference between two electrode compartments is established by formation of metal ammine complexes. The system described employs one anode and one cathode. An external distillation system is used to regenerate anolyte and catholyte. During operation, byproducts (e.g. —Cu(OH)2) reduce the efficiency of the cell. The system employs ammonia which necessitates handling mitigations. During regeneration, a significant amount of heat is lost to the environment. The cost to construct the invention relative to the rate of electrical power generatable is relatively high. Also, the method of maintaining electrodes is cumbersome.

'High Power Thermally Regenerative Ammonia-Copper Redox Flow Battery Enabled by a Zero Gap Cell Design, Low-Resistant Membranes, and Electrode Coatings', Varada Menon Palakkal, Thu Nguyen, Phuc Nguyen, Mariia Chernova, Juan E. Rubio, Gokul Venugopalan, Marta Hatzell, Xiuping Zhu, and Christopher G. Arges, ACS Applied Energy Materials 2020 3 (5), 4787-4798, (DOI:10.1021/acsaem.0c00400), presents further details on an ammonia-based regenerative battery. The system described employs two electrodes, that alternate as cathode and anode with each regeneration cycle. An external distillation system is used to regenerate anolyte and catholyte. During regeneration, a significant amount of heat is lost to the environment. The cost to construct the invention relative to the rate of electrical power generatable is relatively high. Also, the method of maintaining electrodes is cumbersome.

In 'A bimetallic thermally-regenerative ammonia-based flow battery for lowgrade waste heat recovery', Journal of Power Sciences 424 (2019) 184-192, Wang, Shu, Tian, Huo, Zhu (https://doi.org/10.1016/j.jpowsour.2019.03.086), presents a bimetallic regenerative battery with similar issues to the system described by Arges et. al.

In 'Thermally regenerative copper nanoslurry flow batteries for heat-to-power conversion with low-grade thermal energy', Energy and Environmental Science, Jan. 7, 2020, Maye, Girault, Peljo (https://doi.org/10.1039/DOEE01590C), a thermally regenerative copper nanoslurry flow battery is described. The invention regenerates anolyte and catholyte of the concentration cell by employing an external distillation system. During distillation, a significant amount of heat is lost to the environment. The cost to construct the invention relative to the rate of electrical power generatable is relatively high. Also, the method of maintaining electrodes is cumbersome.

Multi-effect evaporation and multi-effect distillation are techniques that economize the use of heat in systems that employ evaporation, condensation, sea water purification, solute concentration, etc. In multi-effect systems, heat from vapour generated in one "effect" is utilized to generate vapour of another "effect".

In Salinity Gradient Power (SGP), a (salinity) concentration difference is employed to generate an electrical current by the concentration cell principle.

In 'Reverse Electrodialysis-Multi effect Distillation Heat Engine fed by Lithium Chloride solutions', Chemical Engineering Transactions. April 2019, Giacalone, Tamburini, Cipollina, Micale (DOI: 10.3303/CET1974132), the anolyte and catholyte of an SGP system are regenerated by an external multi-effect distillation system. During distillation, a significant amount of heat is lost to the environment. The cost to construct and operate the invention (and SGP systems in general) relative to the rate of electrical power generatable is relatively high. The cost to construct the invention relative to the rate of electrical power generatable is relatively high.

'Thermodynamic study of a distiller-electrochemical cell system for energy production from low temperature heat sources', December 2015 Energy, Carati, Marino, Brogioli (DOI:10.1016/j.energy.2015.09.108) presents a similar system, with similar issues, to that described by Giacalone, Tamburini, Cipollina, Micale.

Accordingly, there remains a need for improvements in the art.

BRIEF SUMMARY OF THE INVENTION

The present invention is directed at electrochemical devices, systems, and methods for facilitating an electrochemical reaction and for generating electrical power and for generating electrical energy from heat energy, and the invention employs the principles of electrochemical cells and distillation.

In some embodiments, cells of a system serve two functions, namely electrochemical concentration cell operation and combination evaporator condenser operation. In some embodiments, this allows a system to be constructed more cost effectively (than would be the case if the two functions were carried out in separate units). In some embodiments, this allows a system to reduce heat losses, improve heat energy to electrical energy conversion efficiency, and operate more cost effectively (than would be case if the two functions were carried out in separate units).

In an embodiment of the present invention, there is provided an electrochemical device system, comprising: a concentration cell encapsulating at least: an electrolytic solution including at least a solvent; two electrodes; and an ion transferer disposed between the two electrodes such that a first compartment and a second compartment are formed within the concentration cell, wherein the solvent is vapourized and condensed within the concentration cell to generate two solutions of differing electrochemical potential for galvanic cell operation and wherein in a first cycle the first compartment is a cathode compartment while the second compartment is an anode compartment and wherein in a second cycle the second compartment is a cathode compartment while the first compartment is an anode compartment.

In another embodiment of the present invention, there is provided an electrochemical device system wherein condensate collected on a surface flows to a sloped portion of the surface and therefrom drips into a compartment of the cell.

In another embodiment of the present invention, there is provided an electrochemical device system wherein electrolytic fluid is sealed within the concentration cell and is not transferred externally.

In another embodiment of the present invention, there is provided an electrochemical device system wherein a total mass of initial fill of the concentration cell is regulated to achieve a target pressure.

In another embodiment of the present invention, there is provided an electrochemical device system wherein a non-condensable gas is added to the concentration cell.

In another embodiment of the present invention, there is provided an electrochemical device system wherein an initial minimum quantity of the electrolytic solution in the concentration cell is such that both sides of the ion transferer are contacted by the electrolytic solution when the electrochemical device is in a position for electrochemical operation.

In another embodiment of the present invention, there is provided an electrochemical device system wherein the electrolytic solution within the concentration cell may be redistributed within the concentration cell.

In another embodiment of the present invention, there is provided an electrochemical device system wherein the concentration cell is movable to redistribute the electrolytic solution within the concentration cell.

In another embodiment of the present invention, there is provided an electrochemical device system wherein an envelope of the concentration cell is stationary and at least one element of the concentration cell is rotatable to redistribute the electrolytic solution within the concentration cell.

In another embodiment of the present invention, there is provided an electrochemical device wherein the concentration cell undergoes heating and electrochemical operation in different positions.

In another embodiment of the present invention, there is provided an electrochemical device wherein a stack including the concentration cell is compressed to achieve sealing between stacked components.

In another embodiment of the present invention, there is provided an electrochemical device system, comprising: at least two concentration cells that exchange heat with each other, each encapsulating at least: an electrolytic solution; two electrodes; and an ion transferer disposed between the two electrodes such that a first side and a second side are formed within a concentration cell.

In another embodiment of the present invention, there is provided an electrochemical device system wherein two or more concentration cells are aligned in a column.

In another embodiment of the present invention, there is provided an electrochemical device wherein the concentration cells are synchronously movable to redistribute the electrolytic solution in the concentration cells.

In another embodiment of the present invention, there is provided an electrochemical device system as defined in the preceding paragraph wherein the electrolytic solution enters or exits at least one concentration cell continuously.

In another embodiment of the present invention, there is provided an electrochemical device system wherein the concentration cells share a common envelope surface.

In another embodiment of the present invention, there is provided an electrochemical device system wherein an electrode on one side of the common envelope surface is in series with an electrode on another side of the common envelope surface.

In another embodiment of the present invention, there is provided a method of using an electrochemical device system, comprising: pouring a solution into the electrochemical device such that it settles at a bottom of the electrochemical device system; applying heat to a bottom surface of a first side of the electrochemical device system; evaporating a solvent such that it moves up to a top surface of the electrochemical device; condensing the solvent at the top surface such that it drips downwards as a condensed solvent; collecting the condensed solvent between a divider and the top surface of the electrochemical device system; causing the condensed solvent and the heated solution to be in contact with a first side and second side of an ion transferer, respectively; extracting electrical energy by connecting external load to electrodes on both sides of an ion transferer, before, during or after heat transfer occurs; and subsequently operating the cell such that functions of electrodes on either side of the ion transferer are reversed.

In another embodiment of the present invention, there is provided an electrochemical device system wherein temperature is monitored and evaporation is stopped after a temperature threshold is reached.

In another embodiment of the present invention, there is provided an electrochemical device system wherein cell current is monitored and cell operation is stopped after a current threshold is reached.

In another embodiment of the present invention, there is provided an electrochemical device system wherein during or after the solvent is evaporated such that it moves up to the top surface of the electrochemical device, heat energy from the solvent is transferred such that it heats a first side of a second concentration cell and causes evaporation of solvent in a first side of a second concentration cell.

With the foregoing in view, and other advantages as will become apparent to those skilled in the art to which this invention relates as this specification proceeds, the invention is herein described by reference to the accompanying drawings forming a part hereof, which includes a description of the typical embodiments of the principles of the present invention.

Other aspects and features according to the present application will become apparent to those ordinarily skilled in the art upon review of the following description of embodiments of the invention in conjunction with the accompanying figures.

BRIEF DESCRIPTION OF THE DRAWINGS

The principles of the invention may better be understood with reference to the accompanying figures provided by way of illustration of an exemplary embodiment, or embodiments, incorporating principles and aspects of the present invention, and in which:

FIG. 11. is a schematic diagrammatic conceptual elevation view of a vertically stacked system of electrochemical cells achieving heat integration, with continuous operation, showing electrodes during relocation, with some components omitted for clarity, according to an embodiment;

DETAILED DESCRIPTION OF EMBODIMENTS OF THE INVENTION

Figure 1:
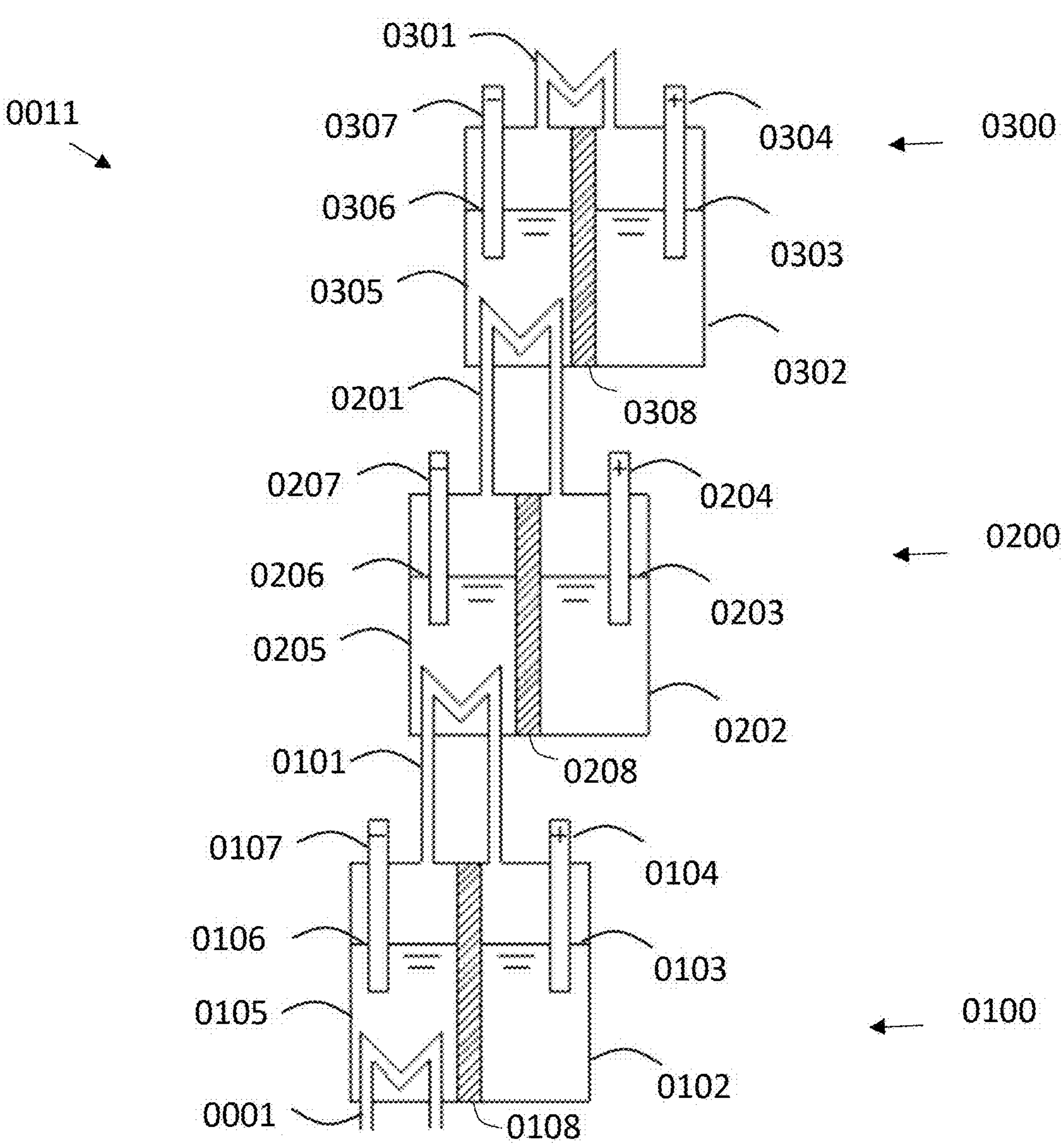
FIG. 1 is a schematic diagrammatic view of a system of electrochemical cells achieving heat integration, according to an embodiment.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and, in some instances, proportions may have been exaggerated in order to more clearly depict certain features of the invention Drawings are not to scale. In some cases, for clarity of presentation, the embodiment presented may be a simplified version of an embodiment more likely to be employed. In certain embodiment descriptions, certain features will be explained in less detail than others, because of commonality with features described elsewhere. In some embodiments shown, thermal insulation is omitted from view for clarity. In some embodiments, a system comprising one or two or three cells is shown for simplicity to represent the principle applicable to a system comprised of fewer or more cells than shown.

According to an embodiment of the invention, as shown in FIG. 1, a system of electrochemical cells achieving heat integration is described. Accordingly, the system may provide cost effective conversion of heat to electricity, and energy storage.

In FIG. 1, for simplicity, three concentration cells 0100, 0200, and 0300 are shown, however the principle described by the embodiment is applicable to a system comprised of more (or fewer) concentration cells than shown. Heat is transferred to a first concentration cell 0100 to establish a concentration gradient therein in order to generate electrical power (by concentration cell type operation). Heat is transferred from the first concentration cell 0100 to a second concentration cell 0200 to establish a concentration gradient therein in order to generate electrical power. Heat is transferred from the second concentration cell 0200 to a third concentration cell 0300 to establish a concentration gradient therein in order to generate electrical power. In concentration cell 0100, a first electrolyte 0103 and a second electrolyte 0106 differ in electrochemical potential due to evaporation by an application of heat; cell 0200 and cell 0300 operate in a similar manner. The concentration gradient is exploited for "concentration cell" type (galvanic cell) operation.

According to an embodiment as shown in FIG. 1, concentration cell 0100 includes a surface 0101, a first chamber 0102, a first electrolyte 0103, a first electrode 0104, a second chamber 0105, a second electrolyte 0106, a second electrode 0107, and an ion exchange membrane 0108 (ion exchange membrane may also be referred to as an ion transferer).

According to an embodiment as shown in FIG. 1, cell 0200 includes a surface 0201, a first chamber 0202, a first electrolyte 0203, a first electrode 0204, a second chamber 0205, a second electrolyte 0206, a second electrode 0207, and an ion exchange membrane 0208 (ion exchange membrane may also be referred to as an ion transferer).

According to an embodiment as shown in FIG. 1, cell 0300 includes a surface 0301, a first chamber 0302, a first electrolyte 0303, a first electrode 0304, a second chamber 0305, a second electrolyte 0306, a second electrode 0307, and an ion exchange membrane 0308 (ion exchange membrane may also be referred to as an ion transferer).

According to an embodiment as shown in FIG. 1, surface 0001 is in connection with concentration cell 0100.

According to an embodiment as shown in FIG. 1, surface 0101, delivers heat to the second electrolyte 0106. Solvent (not shown) vapourizes from second electrolyte 0106 and flows to surface 0101, where solvent (not shown) is condensed, and condensate thus obtained flows to first chamber 0102, and as a result second electrolyte 0106 is concentrated and first electrolyte 0103 is diluted (with respect to a solute). In some embodiments, the heat source may comprise condensing vapour, hot liquid, hot gas, hot solid, molten solid, an electrical resistive element, a waste heat source, a solar source, or an industrial source.

According to an embodiment as shown in FIG. 1, condensation of solvent vapour (not shown) from concentration cell 0100 at surface 0101 delivers heat to second electrolyte 0206. Solvent (not shown) vapourizes from second electrolyte 0206 and flows to surface 0201, where solvent (not shown) is condensed, and condensate thus obtained flows to first chamber 0202, and as a result second electrolyte 0206 is concentrated and first electrolyte 0203 is diluted (with respect to a solute).

According to an embodiment as shown in FIG. 1, condensation of solvent vapour from concentration cell 0200 at surface 0201 delivers heat to second electrolyte 0306. Solvent (not shown) vapourizes from second electrolyte 0306 and flows to surface 0301, where solvent (not shown) is condensed, and condensate thus obtained flows to first chamber 0302, and as a result second electrolyte 0306 is concentrated and first electrolyte 0303 is diluted (with respect to a solute).

According to an embodiment as shown in FIG. 1, condensation of solvent vapour from concentration cell 0300 at surface 0301 delivers heat that is removed. Heat removal at surface 0301 may transfer to one or more of various loads (not shown), according to an embodiment. Loads (not shown) may be an area heating system, a water heating system, process usage, electrochemical system, energy storage system, or ambient heat loss, or other uses according to an embodiment.

According to an embodiment as shown in FIG. 1, during, before or after the heat transfer between concentration cells 0100, 0200 and 0300, each of concentration cells 0100, 0200, and 0300 can be used to generate electrical power by connecting electrical loads (not shown) to electrodes 0104 and 0107 of concentration cells 0100, 0200 and 0300 in a variety of configurations. Electrical generation may be possible due to the (solute) concentration difference between first electrolyte 0103 and second electrolyte 0106 in each cell. Due to the thermal integration of cells 0100, 0200 and 0300, enhanced efficiency in converting input heat to electrical energy may be achieved, according to an embodiment.

According to an embodiment as shown in FIG. 1, during generation of electrical power in cell 0100, material transfers from first electrode 0104 to first electrolyte 0103 (thereby forming a solute in solution) and material transfer from second electrolyte 0106 to second electrode 0107 (thereby removing a solute from solution) and ions traverse ion exchange membrane 0108. According to an embodiment, concentration cells 0200 and 0300 operate in a similar manner.

According to an embodiment as shown in FIG. 1, vapour may be generated in the vicinity second electrode 0107, 0207, and 0307. In some other embodiments, vapour is generated in the vicinity of first electrode 0104, 0204, and 0304. According to an embodiment as shown in FIG. 1, during generation of electrical power, weight loss may occur at first electrode 0104 (and weight gain occurs at second electrode 0107). In some other embodiments, during generation of electrical power, weight gain may occur at second electrode 0107 (and weight loss may occur at first electrode 0104).

According to an embodiment as shown in FIG. 1, solvent (not shown) may be vapourized. In some embodiments, vapourization of a solvent (not shown) and cosolvent may be possible. In some embodiments, vapourization of a secondary liquid mixed with (or miscible with, or complexing with components within) the solvent (not shown) is possible.

In some embodiments, heat applied to electrochemical device system 0011 differs from heat rejected from the electrochemical device system 0011, and a difference between heat applied and heat rejected is stored within electrochemical device system 0011 as energy. In some embodiments, stored energy relates to the (cumulative) difference in heat of solution between first electrolytes 0103, 0203, 0303 and second electrolytes 0106, 0206, 0306 contained within the system.

Figure 2:
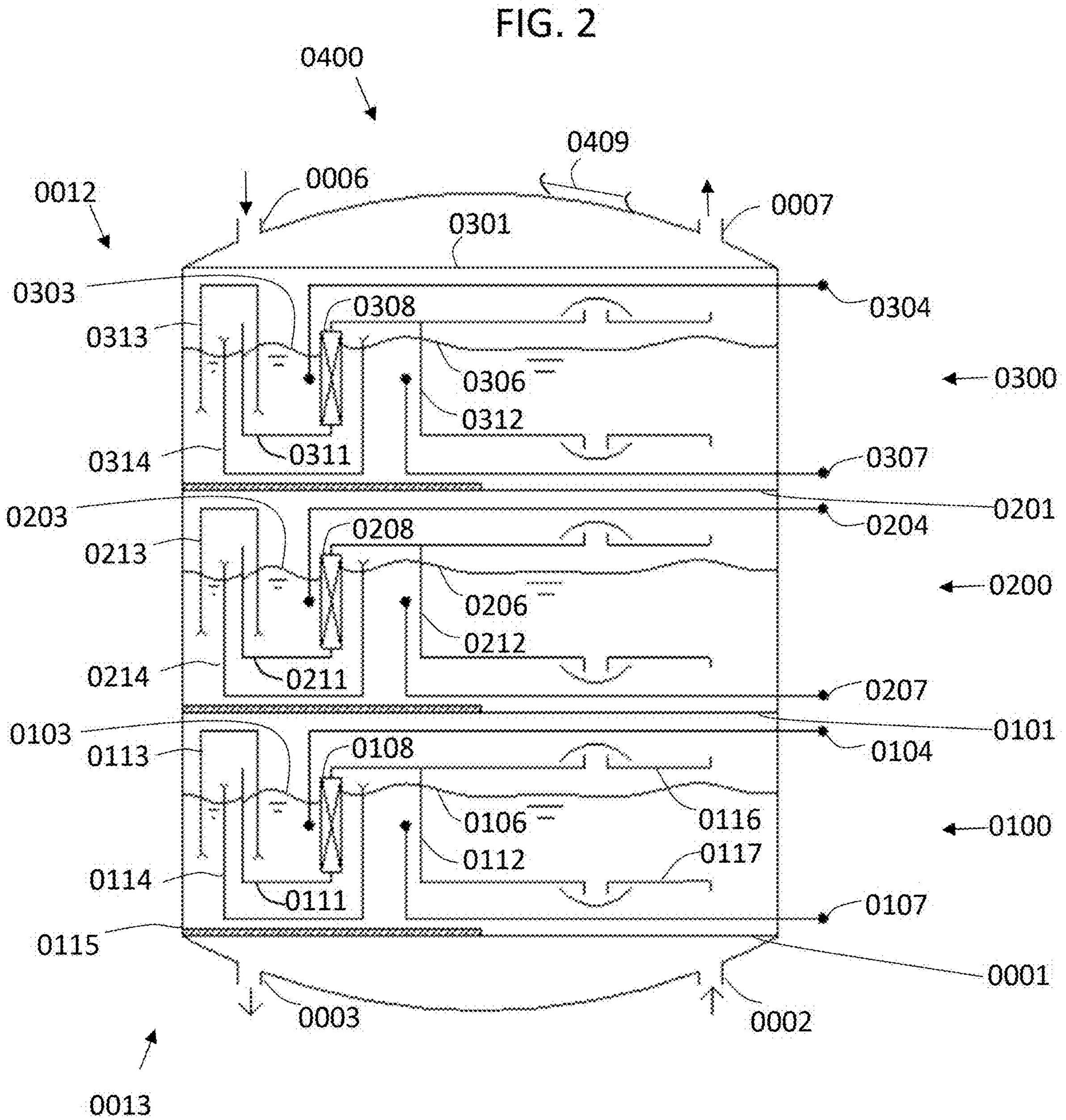
FIG. 2 is a schematic diagrammatic conceptual elevation sectional view of a vertically stacked system of electrochemical cells achieving heat integration, with batch type operation, rotatable, shown in a first position during electricity generation, according to an embodiment.
Figure 3:
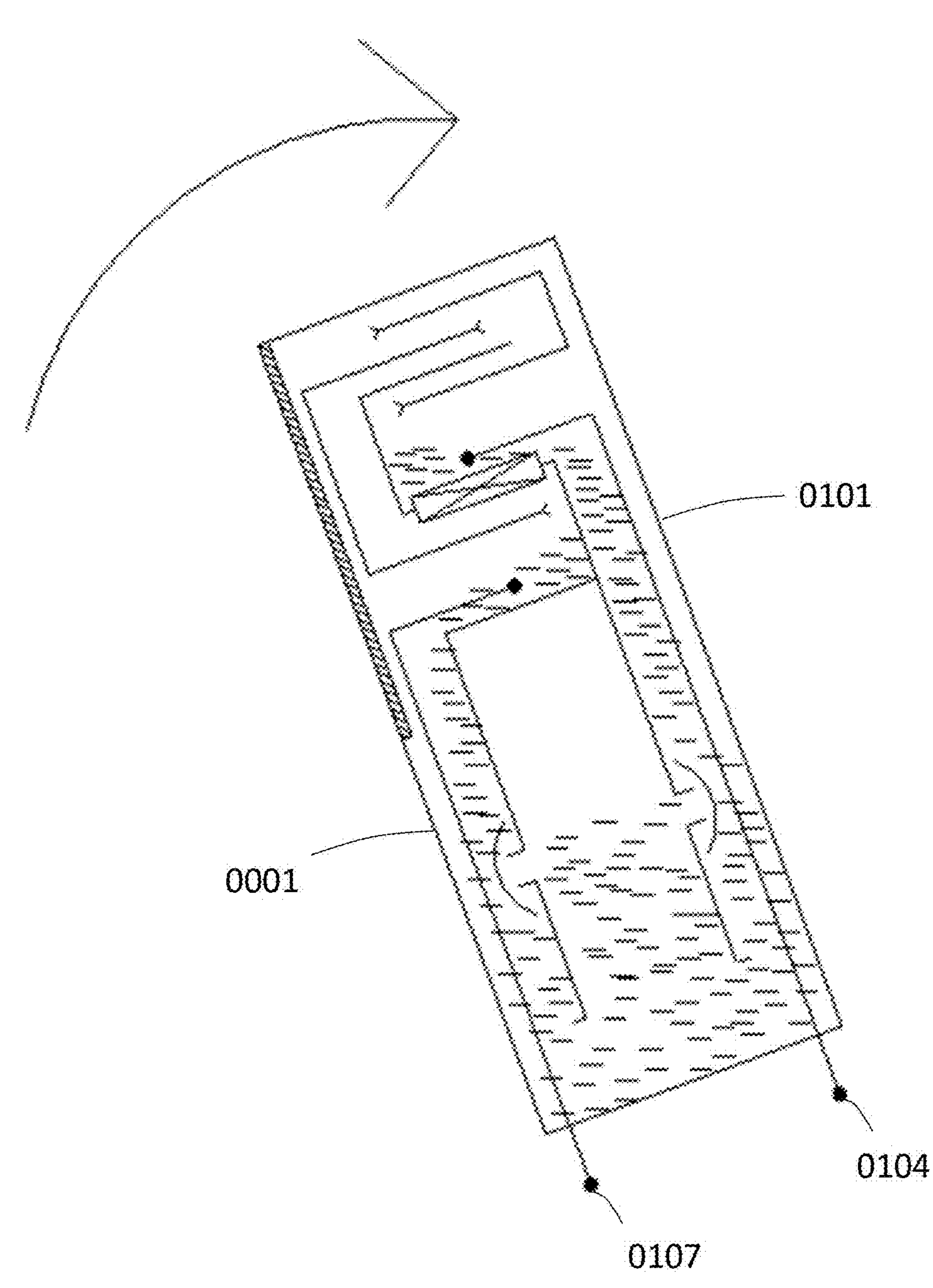
FIG. 3 is a schematic diagrammatic conceptual diagrammatic elevation sectional view of one cell of a vertically stacked system of electrochemical cells achieving heat integration, with batch type operation, rotatable, shown in a second position near the beginning of electrolyte redistribution, according to an embodiment.
Figure 4:
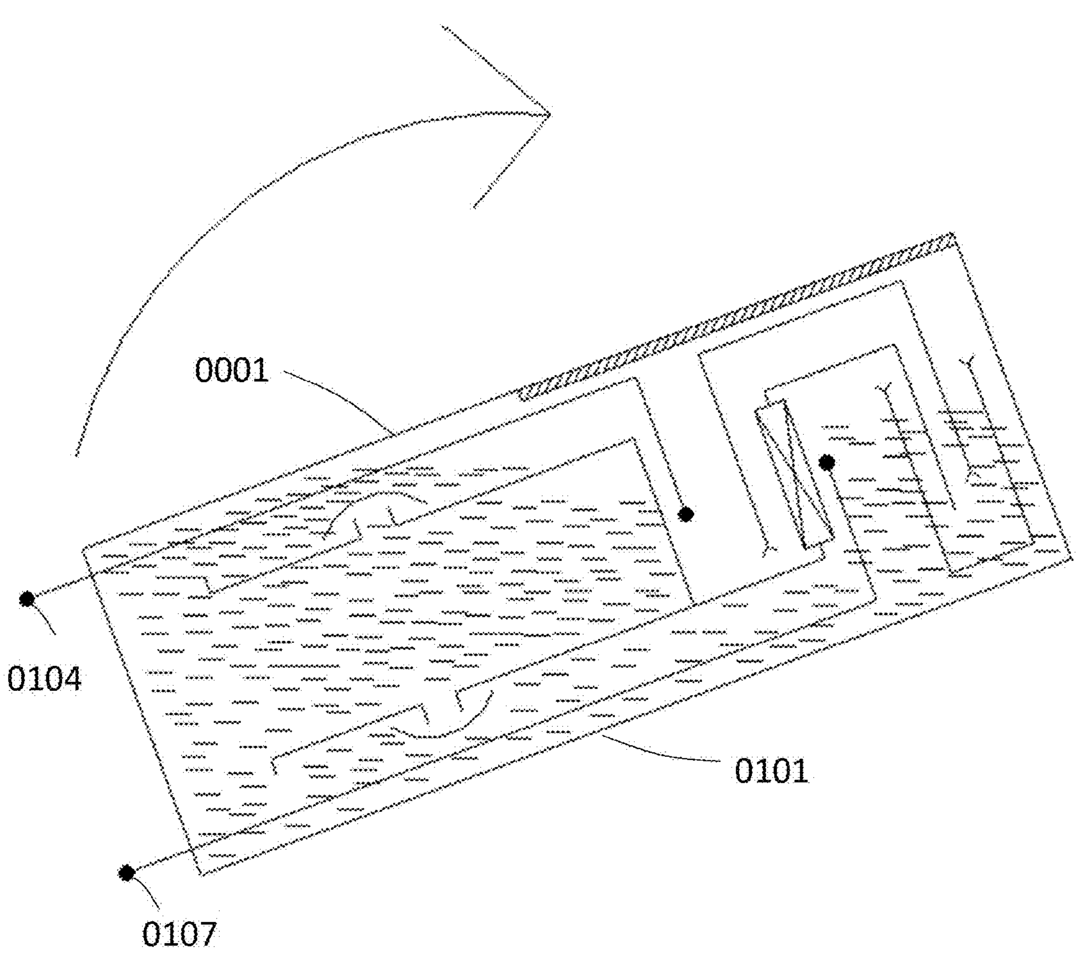
FIG. 4 is a schematic diagrammatic conceptual elevation sectional view of one cell of a vertically stacked system of electrochemical cells achieving heat integration, with batch type operation, rotatable, shown in a third position near the end of electrolyte redistribution, according to an embodiment.

According to an embodiment, as shown in FIGS. 2 through 4, electrochemical cells 0100, 0200, and 0300 that are vertically stacked achieve heat integration and operate with batch type operation are described. Accordingly, electrochemical device system 0011 may provide a cost effective conversion of heat to electricity, and energy storage.

According to an embodiment, FIG. 2 shows electrochemical device system 0011 in a first position during electricity generation. FIG. 3 shows electrochemical device system 0011 near the beginning of electrolyte redistribution, according to an embodiment. FIG. 4 shows electrochemical device system 0011 near the end of electrolyte redistribution, according to an embodiment. For clarity, FIG. 3 and FIG. 4 show only one concentration cell 0100 of electrochemical device system 0011.

According to an embodiment as shown in FIGS. 2 through 4, electrochemical device system 0011 comprises a CuSO4 system with Cu/Cu2+ type concentration cell operation. In other embodiments, anion(s) and cation(s) of electrochemical device system 0011 may differ. According to an embodiment as shown in FIGS. 2 through 4, each cell contains solution with water as solvent (not shown) and CuSO4 as solute (in other embodiments, solvent may differ). According to an embodiment as shown in FIGS. 2 through 4, each of cells 0100, 0200, and 0300 includes Cu electrode material (which in some embodiments is mounted on an inert conductive substrate).

According to an embodiment, the initial fill of solution into each cell 0100, 0200, and 0300 is made judiciously; if initial fill is too much or too little, operation as described may not be possible. According to an embodiment, an initial minimum quantity (or initial fill) of the electrolytic solution in the concentration cell is such that both sides of the ion exchange membrane 0108 (which may also be referred to as an ion transferer) are contacted by the electrolytic solution (comprised of first electrolyte 0303 and second electrolyte 0306) when the electrochemical device 0011 is in a position for electrochemical operation. According to an embodiment, total mass of initial fill of concentration cell 0100 is regulated to achieve target pressure.

In some embodiments, cations within the cell 0100 may include one or more of (without limitation): elements Cu, Ni, Zn, Au, Ag, Sn, Pb, Fe, Cr, Co, Mn, Be, Mg, Ca, Sr, Ba, V, Al, Sb, Sn (oxidation states may vary) or other elements, or other metals, or other non-metals, or other materials that may act electrolytically. In some embodiments cations may include complexes or cationic moieties. In some embodiments, anions within the cell may include (without limitation): $SO_4$, $NO_3$, $NO_2$, $PO_4$, Cl, F, Br, OH, CN, acetate, hypochlorite, perchlorate, chlorate, sulfite, chloride, chromate, sulfide, nitrite, nitride, carbonate, cyanide, iodide or other materials that may act electrolytically. In some embodiments anions may include complexes or anionic moieties. In some embodiments, anion and cation may be similar species differing in oxidation state. One skilled in the art may test materials for use in cell 0100.

In some embodiments, one anion may be in solution; in other embodiments more than one anion may be in solution. In some embodiments, one cation may be in solution; in other embodiments more than one cation may be in solution. In some embodiments, one compound is deposited on electrodes 0104 of 0107; in other embodiments more than one compound may be deposited. In some embodiments, gas is generated and vented.

According to an embodiment as shown in FIGS. 2 through 4, cell 0100 (which is typical of cells 0200 and 0300 as shown) includes a non-condensable gas (not shown). Said non-condensable gas (not shown) may be introduced when pouring a solution into electrochemical device system 0011. In some embodiments, the non-condensable gas (not shown) may be air, nitrogen, argon, or CO2 or other gas. In some embodiments, non-condensable gas (not shown) is not present in concentration cell 0100 (due to vacuum removal of non-condensable gas during filling of electrochemical device system 0011, for example). In some such embodiments, removal of non-condensable gas (not shown) may be deliberate to affect concentration cell 0100 pressure favourably.

According to an embodiment as shown in FIG. 2, concentration cell 0100 operates near atmospheric pressure. In other embodiments, concentration cell 0100 may operate at pressures higher or lower than atmospheric pressure, which in some embodiments affects a boiling temperature of solvent (not shown) therein. In some embodiments, pressure within concentration cell 0100 and 0200 and 0300 may vary, according to temperature distribution.

According to an embodiment as shown in FIG. 2, three concentration cells, namely cells 0100, 0200, and 0300, are shown. In some embodiments, more or fewer than three concentration cells may be employed.

According to an embodiment, as shown in FIG. 2, concentration cells 0100, 0200, and 0300 are integrated thermally within a vertical stack 0012. Vertical stack 0012 may comprise two or more concentration cells. According to an embodiment as shown in FIG. 2 through 4, vertical stack 0012 comprises three concentration cells 0100, 0200, and 0300. According to an embodiment, heat is applied to a bottom of vertical stack 0012, and due to heat integration, solute concentration in first electrolyte 0103 differs from solute concentration in a second electrolyte 0106. According to an embodiment, during electrical power generation, second electrode 0107 weight gain and first electrode 0104 weight loss may occur; electrical power generation may occur in cycles.

According to an embodiment, as shown in FIG. 2, after a first cycle of power generation (corresponding to some transfer of electric charge), vertical stack 0012 and concentration cells 0100, 0200, and 0300 are inverted, and thereby electrolytes are redistributed and electrodes 0104 and 0107 are repositioned due to the inversion, and during subsequent electrical power generation, namely a second cycle of power generation, functions of electrodes reverses; namely, electrode 0107, which underwent weight gain in the prior cycle, now undergoes weight loss (i.e.—former cathodes become anodes) and electrode 0104 that previously underwent weight loss now undergo weight gain (i.e.—former anodes become cathodes). In this manner, numerous cycles may be carried out.

According to an embodiment, as shown in FIG. 2, electrochemical device system 0011 includes a column 0400 in a vertical orientation, within which are integrated three electrochemical cells 0100, and 0200, and 0300. According to an embodiment, column 0400 is thermally insulated by insulation 0409 (in other embodiments, various insulation types and configurations are possible). According to an embodiment, as shown in FIG. 2, first external fluid manifold 0401 is located at one end of column 0400, and a second external fluid manifold 0405 is located at another end; manifolds 0401 and 0405 may allow external heating fluids to transfer heat to or from the electrochemical device system 0011.

According to an embodiment, as shown in FIG. 2, concentration cell 0100 includes surface 0101, a first divider 0111, a first electrolyte 0103, a first electrode 0104, a second divider 0112, a second electrolyte 0106, a second electrode 0107, an ion exchange membrane 0108, a first tube 0113, and a second tube 0114.

According to an embodiment as shown in FIG. 2, concentration cell 0200 includes surface 0201, a first divider 0211, a first electrolyte 0203, a first electrode 0204, a second divider 0212, a second electrolyte 0206, a second electrode 0207, an ion exchange membrane 0208, a first tube 0213, and a second tube 0214.

According to an embodiment, as shown in FIG. 2, concentration cell 0300 includes surface 0301, a first divider 0311, a first electrolyte 0303, a first electrode 0304, a second divider 0312, a second electrolyte 0306, a second electrode 0307, an ion exchange membrane 0308, a first tube 0313, and a second tube 0314.

According to an embodiment as shown in FIG. 2, surface 0001 is in connection with cell 0100.

According to an embodiment as shown in FIG. 2, electrodes 0104, 0107, 0204, 0207, 0304, and 0307 enter their respective concentration cells 0100, 0200, and 0300 via envelopes 0013 of concentration cells 0100, 0200, and 0300 (which also make up envelope 0013 of column 0400). Outside of column 0400, electrodes 0104 and 0107 may be wired to external electrical loads (not shown) in a variety of configurations.

According to an embodiment as shown in FIG. 2, in concentration cell 0100, first divider 0111 and second divider 0112 are cylindrical in shape and can retain liquid, depending on the position of cell 0100. In some embodiments, other shapes of dividers 0111 and 0112 may be employed.

According to an embodiment as shown in FIG. 2, when the electrochemical device system 0011 is positioned as shown in FIG. 2, first divider 0011 is in an upright position (able to collect first electrolyte 0103), and second divider 0112 is in an inverted position (unable to retain liquid). According to an embodiment as shown in FIG. 2, when electrochemical device system 0011 is positioned as shown in FIG. 2, first divider 0111 is oriented such that a dilute solution, namely first electrolyte 0103, collects within it and communicates with both first electrode 0104 and ion exchange membrane 0108 (the other side of which communicates with second electrolyte 0106) to enable electrochemical reaction. After the first cycle of power generation, and subsequent inversion of column 0400, and subsequent power generation, second divider 0112 and related components (and fluids) operate in a similar manner to that just described for first divider 0111. Each cell includes dividers that operate in this manner. In other embodiments, dividers, their geometry, their implementation, and related components may vary.

Cumulative heat loss from an uppermost concentration cell, or concentration cell 0300 as shown in FIG. 2, may be measured to determine whether or not evaporation has occurred throughout column 0400 to the desired extent (due to heat integration of concentration cells 0100, 0200, and 0300) to the desired extent, and to thereby identify the time at which external heat application should end. Cumulative heat loss may be measured by measuring a sensible or latent heat change of a fluid exchanging heat with concentration cell 0300. Sensible heat change may be measured by measuring the temperature change of a known mass of a known fluid. Latent heat change may be measured by weight collection of condensate. A combination of heat change measurement methods be employed.

According to an embodiment as shown in FIG. 2, electrochemical device system 0011 may achieve heat integration and electrical power generation, as will now be described.

According to an embodiment as shown in FIG. 2, at surface 0001, a heat source(s) delivers heat to second electrolyte 0106. Heat source may be condensing vapour, hot liquid, hot gas, electrical resistive element, waste heat source, or solar source, or other. According to an embodiment as shown in FIG. 2, solvent (not shown) vapourizes from second electrolyte 0106 and flows to surface 0101, where solvent (not shown) is condensed, and condensate thus obtained flows to first divider 0111, and as a result second electrolyte 0106 is concentrated and first electrolyte 0103 is diluted.

According to an embodiment as shown in FIG. 2, condensation of solvent vapour from concentration cell 0100 at surface 0101 delivers heat to second electrolyte 0206, solvent (not shown) vapourizes from second electrolyte 0206 and flows to surface 0201, where solvent (not shown) is condensed, and condensate thus obtained flows to first divider 0211, and as a result second electrolyte 0206 is concentrated and first electrolyte 0203 is diluted.

Heat integration of concentration cells 0100 and 0200 has been described. According to an embodiment, heat integration of concentration cells 0200 and 0300 is similar. Concentration cell 0300 and surface 0301 are thermally integrated. Heat removal at surface 0301 may transfer to one or more of various loads (not shown).

According to an embodiment, as shown in FIG. 2, during or before or after the heat transfer between cells, each of cells 0100, 0200, 0300 may be used to generate electrical power by connecting electrical loads (not shown) to electrodes (e.g.—0104 and 0107) in a variety of configurations. Electrical generation may be possible due to the (solute) concentration difference between first electrolyte 0103 and second electrolyte 0106 typical of each cell.

According to an embodiment, as shown in FIG. 2, due to the heat applied, second electrolyte 0106 becomes concentrated (in Cu2+) and serves as catholyte, which causes second electrode 0107 to act as a cathode, and first electrolyte 0103 becomes diluted (in Cu2+) and serves as an anolyte, which causes first electrode 0104 to act as an anode, and thus electrical power generation occurs. According to an embodiment, as shown in FIG. 2, after some power generation, the anodic first electrode 0104 loses mass and cathodic second electrode 0107 gains mass. After some operating time, as first electrolyte 0103 and second electrolyte 0106 equilibrate, electrical power generation may stop, marking an end of the first power cycle. Next, electrolytes are redistributed (by inversion as will be described below) and electrodes 0104 and 0107 are repositioned (by inversion as will be described below), and after subsequent heat generation, a second cycle of electrical power generation may occur, and the functions of the first electrode 0104 and second electrode 0107 may be reversed (electrode 0104 becomes cathodic, electrode 0107 becomes anodic).

In some embodiments, current generated during the power generation phase may be monitored to ascertain changes in electrodes 0104 and 0107 and electrolytes 0103 and 0106, and to use such information to identify the end of power generation and the beginning of electrolyte redistribution. It is also possible to arrange electrodes 0104 and 0107 such that electrical resistance of (at least a portion of) the electrode can be measured, and to use such information to determine when to initiate electrolyte redistribution.

According to an embodiment, as shown in FIG. 2, concentration cell 0100 includes insulator 0115, first plate 0116, and second plate 0117. Insulator 0115 is adjacent to surface 0001, and reduces the heat transferred to divider 0111, with an aim of directing heat (and vapour) directly to the cell above (i.e.—to the right of FIG. 2). According to an embodiment as shown in FIG. 2, first plate 0116 provides a tray and path for condensate formed in cell 0100 to flow to first divider 0111. Second plate 0117 serves a similar function after concentration cell is inverted, and second plate 0117 also promotes a desired circulation of vapour (towards surface 0101) according to the position shown in FIG. 2. Riser pipes and caps are integral to plates 0116 and 0117 as shown in FIG. 2 and can be used to promote the desired circulation of vapour and condensate.

According to an embodiment, as shown in FIG. 3, a beginning stage of electrolyte redistribution (and electrode relocation) will now be described with respect to concentration cell 0100 (cells 0200 and 0300 operate in a similar manner).

According to an embodiment, as shown in FIG. 3, after the first power cycle, column 0400 and concentration cells therein (0100, 0200, and 0300) are inclined from a vertical orientation by rotation in a direction indicated by the arrow in FIG. 3 to begin an electrolyte redistribution process.

According to an embodiment as shown in FIGS. 3 through 4, as column 0400 is tipped, first divider 0111 tips with it as it rotates, and first electrolyte 0103 spills out of first divider 0111. As this occurs, first electrolyte 0103 may be emptied via first tube 0113 also. First electrolyte 0103 spilling from divider 0111 and first tube 0113 falls to lowest internal surfaces of cell 0100, to join second electrolyte 0106 in a mixture.

According to an embodiment as shown in FIGS. 3 through 4, during tipping, second divider 0112 rotates towards a position for condensate collection. As this occurs, second electrolyte 0106 may be emptied via second tube 0114. Due to geometry of second divider 0112, second divider 0112 does not retain second electrolyte 0106 as it is rotated to the desired position, and second electrolyte 0106 that is emptied from second divider 0112, together with spillage from second tube 0114 falls to the lowest internal surfaces of concentration cell 0100.

According to an embodiment, as shown in FIG. 4, a latter stage of electrolyte redistribution (and electrode relocation) will now be described with respect to concentration cell 0100 according to an embodiment.

According to an embodiment, as shown in FIG. 4, as second divider 0112 reaches its final position (for the current cycle) above first divider 0111, it remains empty. In a subsequent application of heat, solvent (not shown) condensate collects in second divider 0112, and second electrode 0107 acts as an anode in the subsequent power cycle.

According to an embodiment, as first divider 0111 reaches a final position, vapour or non-condensable gas (not shown) trapped within first divider 0111 are evacuated via first tube 0113 under the static pressure of the mixture of electrolyte 0103 and 0106 that has collected on the lowest internal surfaces of concentration cell 0100, namely on surface 0101. In subsequent operation, first tube 0113 may facilitate further evacuation of vapour or non-condensable gas (see the following paragraph) from first divider 0111. In some embodiments, evacuation of vapour or non-condensable gas from inverted divider 0111 facilitates flooding of an adjacent electrode 0104 or 0107 and ion-exchange membrane 0108, thereby facilitating electrochemical reaction. In some embodiments, accumulation of vapour or non-condensable gas may be tolerable.

In some embodiments, dividers 0111 and 0112 may be integrated with electrodes 0104 and 0107 respectively.

In some embodiments, a tube similar to first tube 0113 is attached to a surface similar to surface 0101 and a tube similar to second tube 0114 is attached to a surface similar to surface 0001. In some embodiments, such attachments may facilitate temperature elevation of the tube 0014 situated at the bottom of concentration cell 0100 and temperature depression of the tube 0013 situated at the top of the cell. In some embodiments, temperature elevation of the tube 0014 situated at the bottom of concentration cell 0100 enhances boiling of solvent from same, which may facilitate use of same for venting of vapour and non-condensable gas from the (lower) inverted divider 0112. In some embodiments, temperature depression of the tube situated at the top of the cell enhances condensation and flow of condensate into divider 0111. In some embodiments, dimples or slopes or features of surface 0101 of promote condensate flow in the desired direction.

In some embodiments, tubes 0113 and 0014 may be routed or disposed to enhance evaporation from the tube; for example, by adding exterior insulation to certain portions of the tubes 0113 and 0014 to minimize heat dissipation from the tube 0013 and 0014 except by boiling of its contents. In some embodiments, such tubes 0013 and 0014 may be routed to better facilitate condensation; for example, by aligning the tube 0013 attachment point with divider 0111. In some embodiments, tubes 0013 and 0014 are not connected to surfaces 0101 or 0001 respectively. In some embodiments, an alternate tube arrangement may be implemented. Some embodiments do not comprise such tubes.

In some embodiments, trays with riser pipes and caps facilitate flow of vapour in a desired direction from a lower region of concentration cell 0100 to an upper region of concentration cell 0100, and a flow of condensed solvent (not shown) in a desired direction.

According to an embodiment, as shown in FIG. 2 through 4, after the first power generation cycle, column 0400 is rotated clockwise (CW). After a second power generation cycle, column 0400 would be returned to an initial position, as shown in FIG. 2, by rotating counter-clockwise (CCW). In some embodiments, rotation alternates CCW, CW, CCW, CW, and so on. In some embodiments, depending on the divider arrangement, rotation alternates CCW, CCW, and so on. Or according to another embodiment, CW, CW, and so on.

According to an embodiment, as shown in FIG. 2 through 4, batch operation cycles may occur in rhythm with diurnal solar heat generation. Solar heat collection (from collector plates or concentration or the like) may provide low grade heat diurnally to an electrochemical device system 0011. One possible method of operating electrochemical device system 0011 may comprise applying heat during times of solar collection to regenerate first electrolyte 0103 and second electrolyte 0106 (having sized cells 0100, 0200, 0300 appropriately to receive one day's heat energy, for example). Then, after solar collection and regeneration is complete, the electrochemical device system 0011 may act as a battery until discharge of stored electrical energy at a favourable time. Favourable times may include for example, windows of time during which demand for power and electrical costs are highest. After electrical discharge, fluid may be redistributed (by inverting the column) in preparation for another day of similar operation.

According to an embodiment, as shown in FIG. 2 through 4, all concentration cells 0100, 0200, and 0300 have identical dimensions. In some embodiments, dimensions of cells 0100, 0200, and 0300 differ. In some embodiments, all concentration cells 0100, 0200, and 0300 operate at similar pressure; in other embodiments at different pressures (e.g.—due to initial fill or due to temperature variation between cells 0100, 0200, and 0300). According to an embodiment, as shown in FIG. 2 through 4, quantity of the mixture first electrolyte 0103 and 0106 is the same in each cell; in other embodiments, quantities differs by cell.

In some embodiments, envelope 0013 is formed by employing wafers sandwiched between cells 0100, 0200, and 0300. In some embodiments, a stack of wafers and cells may be compressed together (for example, by end plates or a bolt assembly or flanges or the like).

According to an embodiment, as shown in FIG. 2 through 4, electrochemical device system 0011 may be configured with a cylindrical column 0400 cross section. Other embodiments may be configured with a square or rectangular or oval or other cross-section shape.

A variety of divider configurations and orientations may be used. Divider 0111 shapes may be cylindrical, conical, semi-conical, alembic related, klein bottle related, or prismatic.

In some embodiments, concentration cell 0100 comprises a port, and one or more ports may permit addition or removal of fluids from concentration cell 0100, during operation or construction or assembly or maintenance. In some embodiments, fluids are hermetically sealed in concentration cell 0100.

In some embodiments, a static pressure gradient exists across ion exchange membrane 0108. In other embodiments, it does not (for example to reduce solvent permeation across ion exchange membrane 0108). In some such embodiments, static pressure gradient is reduced or minimized to zero in part by selecting an initial fill of the mixture of first solvent 0103 and second electrolyte 0106 to suit concentration cell 0100 geometry.

In some embodiments, the surface 0101 between cells has a sloped face. Condensate may form on the surface and cling to the surface as the condensate slides to a low point (or features) on the surface, where it drops into the divider 0111. In some such embodiments, the surface (or parts thereof) may be fabricated to exhibit a desired hydrophobicity or hydrophilicity to achieve the desired condensate movement.

In some embodiments, surface 0001 may include a protrusion that is used to apply heat to the desired location (to promote vapour flow in the desired direction).

In some embodiments, dividers 0111 include an insulator (similar to insulator 0115) that mitigates heat transfer through divider 0111 (e.g.—to avoid re-vapourizing condensate in divider 0111 above, which if left unmitigated may reduce the thermal-to-electrical energy efficiency of electrochemical device system 0011).

According to an embodiment, as shown in FIGS. 2 through 4, concentration cell 0100 is hermetically sealed. Due to the sealing arrangement, the mass of solvent (not shown explicitly), Cu (not shown explicitly), and SO4 (not shown explicitly) in the cell 0100 may remain constant. This may ensure that concentration cell 0100 is not stripped of necessary components for concentration cell operation over time.

For clarity, FIG. 2 through 4, shows first divider 0111 and second divider 0112 in a manner that enables clear discussion. According to another embodiment, first divider 0111 and second divider 0112 each may occupy approximately one quarter of a footprint of concentration cell 0100, wherein first divider 0111 and second divider 0112 are approximately symmetrical, adjoining, and occupying together an area of concentration cell 0100 that utilizes approximately half of the footprint.

Figure 5:
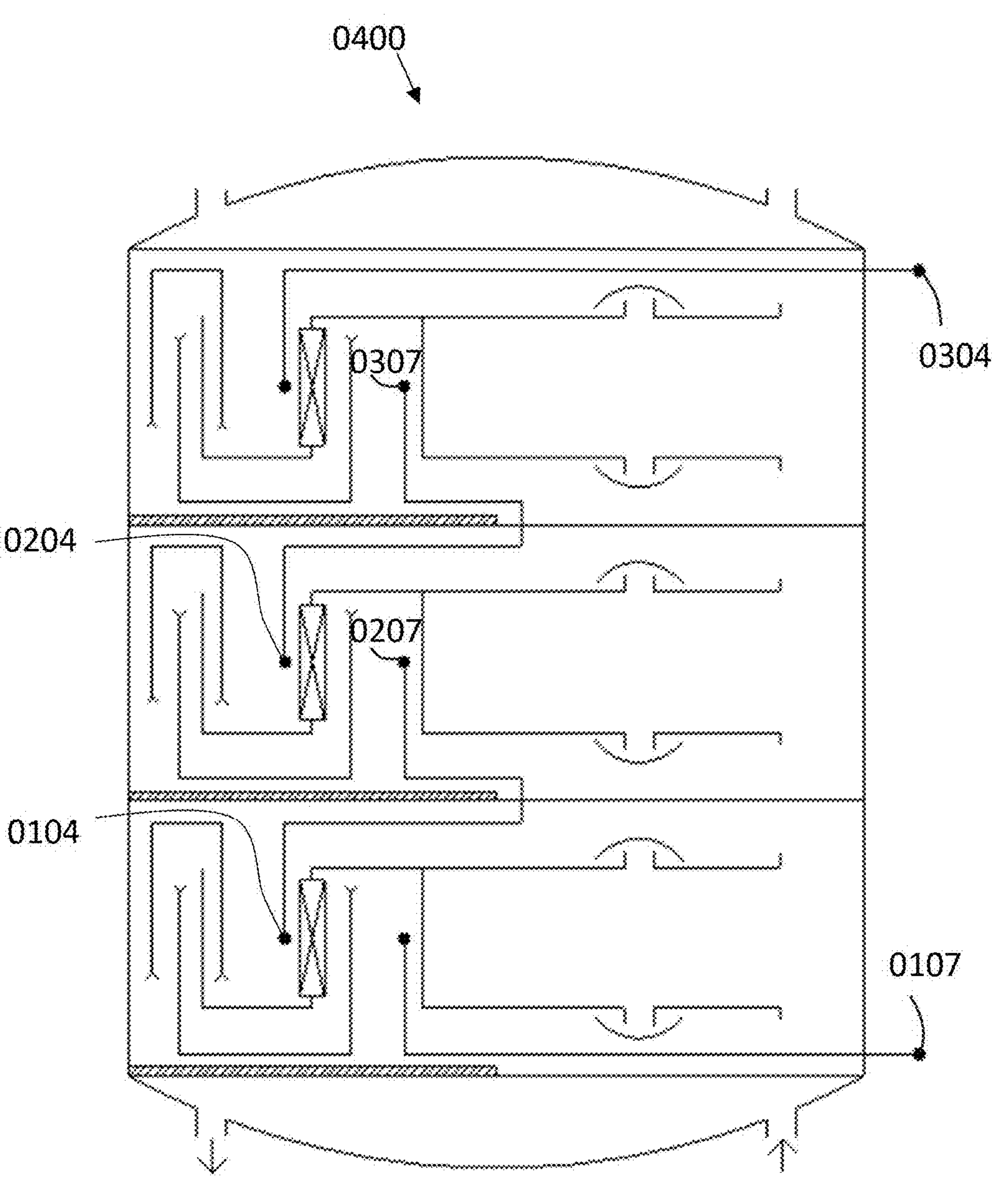
FIG. 5 is a schematic diagrammatic conceptual elevation view of a vertically stacked system of electrochemical cells achieving heat integration, with batch type operation, with electrodes arranged for direct series connection, according to an embodiment.

According to and embodiment, as shown in FIG. 5, a vertically stacked system of electrochemical cells achieving heat integration, with batch type operation, with electrodes arranged for direct series connection is described. Accordingly, the system may provide cost effective conversion of heat to electricity and energy storage.

According to an embodiment, as shown in FIG. 5, the electrochemical device system 0011 operates in a similar manner to that of an embodiment as shown in FIG. 2 through 4, however electrodes of adjacent cells are connected within the column 0400. For clarity, and due to similarity with the embodiment shown in FIG. 2 through 4, fewer annotations are included in FIG. 5.

First electrode 0104 (of cell 0100) and second electrode 0207 (of cell 0200) are directly connected by a wire or connector passing through the interface between cell 0100 and 0200, namely surface 0101.

First electrode 0204 (of cell 0200) and second electrode 0307 (of cell 0300) are directly connected by a wire or connector passing through the interface between cell 0200 and 0300, namely surface 0201.

Second electrode 0107 (of cell 0100) and first electrode 0304 (of cell 0300) protrude through the wall of the column 0400, and outside of the column they may be wired to external electrical loads (not shown).

In comparison to an embodiment as shown in FIG. 2 through 4, an advantage of a series electrical connection arrangement of an embodiment as shown in FIG. 5 may be that a number of protrusions through envelope 0013 of the column 0400 may be reduced.

According to an embodiment, as shown in FIG. 5, a pair of electrodes protrudes through the cylindrical portion of column 0400 envelope 0013. In some similar embodiments, electrodes may protrude through the column 0400 top and bottom (e.g.—to simplify insulation, allow a vacuum jacket, or for other reasons).

Figure 6:
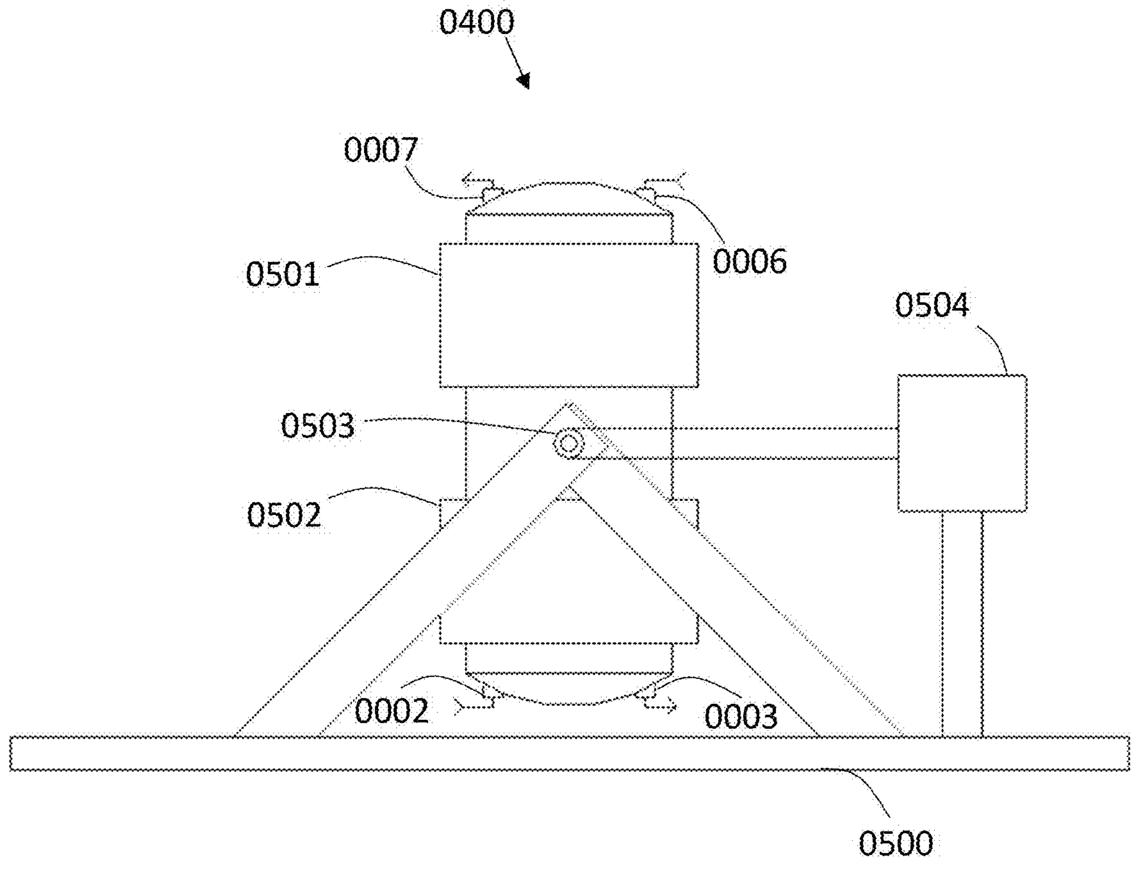
FIG. 6 is a schematic diagrammatic conceptual elevation view of a vertically stacked system of electrochemical cells achieving heat integration, with batch type operation, with rotatable body, according to an embodiment.

According to an embodiment, as shown in FIG. 6, concentration cells 0100, 0200, and 0300 are vertically stacked and achieve heat integration with batch type operation, and a column 0400 comprises a stack 0012 of cells and column 0400 is a rotatable body. Accordingly, electrochemical device system 0011 may provide cost effective conversion of heat to electricity and energy storage.

According to an embodiment, as shown in FIG. 6, concentration cells 0100, 0200, and 0300 operate in a similar to an embodiment as shown in FIG. 2 through 4, and for clarity, details of the cells of the system are omitted.

According to an embodiment, as shown in FIG. 6, column 0400 may be thermally insulated by first vacuum jacket 0501 and second vacuum jacket 0502, all well as other insulation items. A first external fluid inlet port 0002 and first external fluid outlet port 0003 may be located at one end of the column 0400, and a second external fluid inlet port 0006 and second external fluid outlet port 0007 may be located at another end. These ports may be used to allow external fluid to transfer heat to and from electrochemical device system 0011.

According to an embodiment, as shown in FIG. 6, column 0400 is mounted on frame 0500, by rotatable connection 0503, roughly at the centre of mass of column 0400. Rotary actuator 0504 is linked to rotatable connection 0503. When desired, rotary actuator 0504 can be operated to invert column 0400, which may permit electrolyte redistribution and a new cycle of heating and electrical power generation.

According to an embodiment, as shown in FIG. 6, a tubing network communicates fluid to ports 0004, 0003, 006 and 007. The tubing network may be flexible and arranged to pass near rotatable connection 0503 to minimize displacement of the tubing network while the column 0400 is inverted. In some embodiments, column inversion is accommodated by incorporating swivel joints in the tubes of the said tubing network. In some embodiments, all tubes of the tubing network communicate with a single external reservoir.

Figure 7:
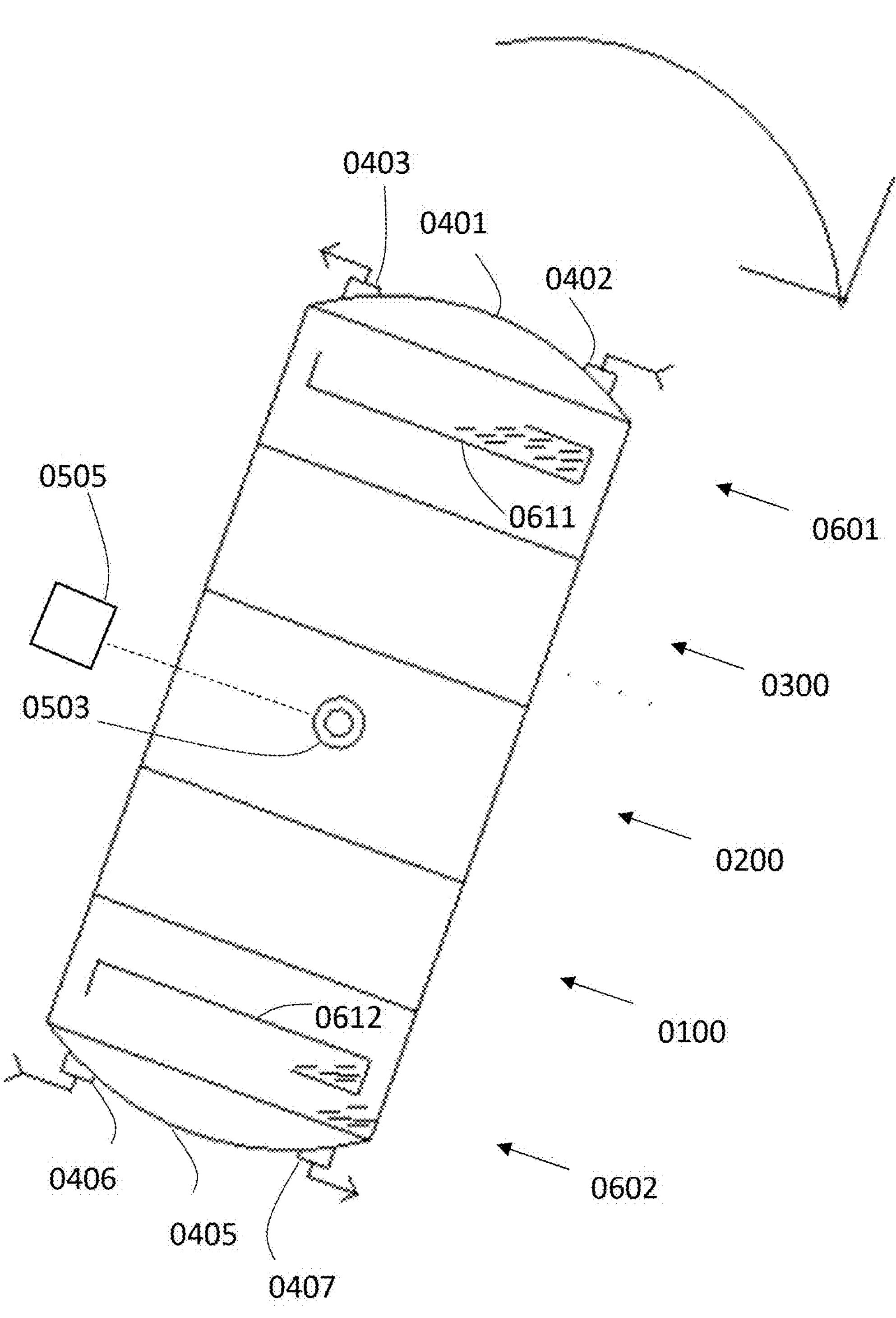
FIG. 7 is a schematic diagrammatic conceptual elevation view of a vertically stacked system of electrochemical cells achieving heat integration, with batch type operation, with rotatable body, with rotation actuated by unbalanced fluid distribution, according to an embodiment.

According to an embodiment, as shown in FIG. 7, concentration cells 0100 of electrochemical device system 0011 are stacked vertically and achieve heat integration, with batch type operation. According to an embodiment, as shown in FIG. 7, electrochemical device system 0011 has a rotatable body, with rotation actuated by unbalanced fluid distribution.

According to an embodiment, as shown in FIG. 7, column 0400 is mounted on frame 0500, by rotatable connection 0503, roughly at a centre of mass of column 0400. A brake 0505 may be linked to rotatable connection 0503. When desired, brake 0505 may be disengaged to allow column 0400 to invert itself under its own weight (as will be described in the following paragraphs). Subsequently, brake 0505 may be engaged, or reengaged, to maintain column 0400 in its new orientation, until it is desired that column 0400 reverts itself (to its original position) under its own weight (as will be described in the following paragraphs). FIG. 7 depicts the column 0400 in an early stage of inversion (under its own weight), according to an embodiment.

According to an embodiment, as shown in FIG. 7, first external fluid chamber 0401 is adjacent to, and thermally integrated with, first intermediate chamber 0601, which is adjacent to, and thermally integrated with concentration cell 0300. Inlet port 0402 may provide fluid to first external fluid chamber 0401, and outlet port 0403 may receive fluid from first external fluid chamber 0401.

According to an embodiment, as shown in FIG. 7, second external fluid chamber 0405 is adjacent to, and thermally integrated with, second intermediate chamber 0602, which is adjacent to, and thermally integrated with concentration cell 0100. Inlet port 0406 may provide fluid to second external fluid chamber 0405, and outlet port 0407 receives fluid from second external fluid chamber 0405.

According to an embodiment, as shown in FIG. 7, concentration cell 0100 may be thermally integrated with concentration cell 0200 which may be thermally integrated with concentration cell 0300.

According to an embodiment, as shown in FIG. 7, within second intermediate chamber 0602 is a vapourizing liquid and divider 0612. Heat applied at second external fluid chamber 0602 may cause vapourization within second intermediate chamber 0602, which may transfer heat to concentration cell 0100, and subsequently condensate may flow to divider 0612, which may shift the centre of mass of the column 0400 upward.

According to an embodiment, as shown in FIG. 7, within first intermediate chamber 0601 is a vapourizing liquid and divider 0611. Heat applied at cell 0300 may cause vapourization within first intermediate chamber 0601, which may transfer heat to first external fluid chamber 0401, and subsequently condensate may flow to divider 0611, which shifts the centre of mass of the column 0400 upward.

According to an embodiment, as shown in FIG. 7, a combined shift in centre of mass within chambers 0601 and 0602 may raise the column 0400 centre of mass sufficiently to initiate rotation upon release of brake 0505. After initiation of rotation, fluid within chambers 0601 and 0602 may flow to the lowest internal surface, and column 0400 may become stable in a new orientation. After subsequent heating, a state of unbalance (shift of centre of mass upwards) is reestablished, and the cycle may be repeated.

In some embodiments, limits of the rotatable connection 0503 permit the column 0400 to rotate within a 180 degree range (only), such that rotations proceed in a 180 deg. CW, 180 deg. CCW, 180 deg. CW, and so on, in succession. In some embodiments, limits of the rotatable connection 0503 prevent complete vertical alignment, and after rotation, the column 0400 remains slightly inclined from vertical such that after a shift in centre of mass the next rotation proceeds immediately in the desired direction. According to some embodiments, rotatable connections 0503 may slow the rate of rotation, which may facilitate desired transfer of the mixture of first electrolyte 0103 and second electrolyte 0106 within the system, and may mitigate equipment damage and risk to people nearby.

In some embodiments, such as the embodiment of FIG. 7, dedicated chambers achieve unbalanced fluid distribution for the purpose of initiating rotary movement of the column 0400. In some embodiments, the cumulative shift to the centre of mass achieved by vapourization or condensation in each concentration cell 0100, 0200, and 0300 is sufficient (or complementary) for initiating rotary movement of the column 0400.

In some embodiments similar to the embodiment of FIG. 7, electrochemical device system 0011 may employ a brake 0505 that is disengaged before rotation and reengaged after rotation. In some embodiments, reengagement is effected passively and automatically by a mechanism (e.g.—ratchet type or catch type).

Figure 8:
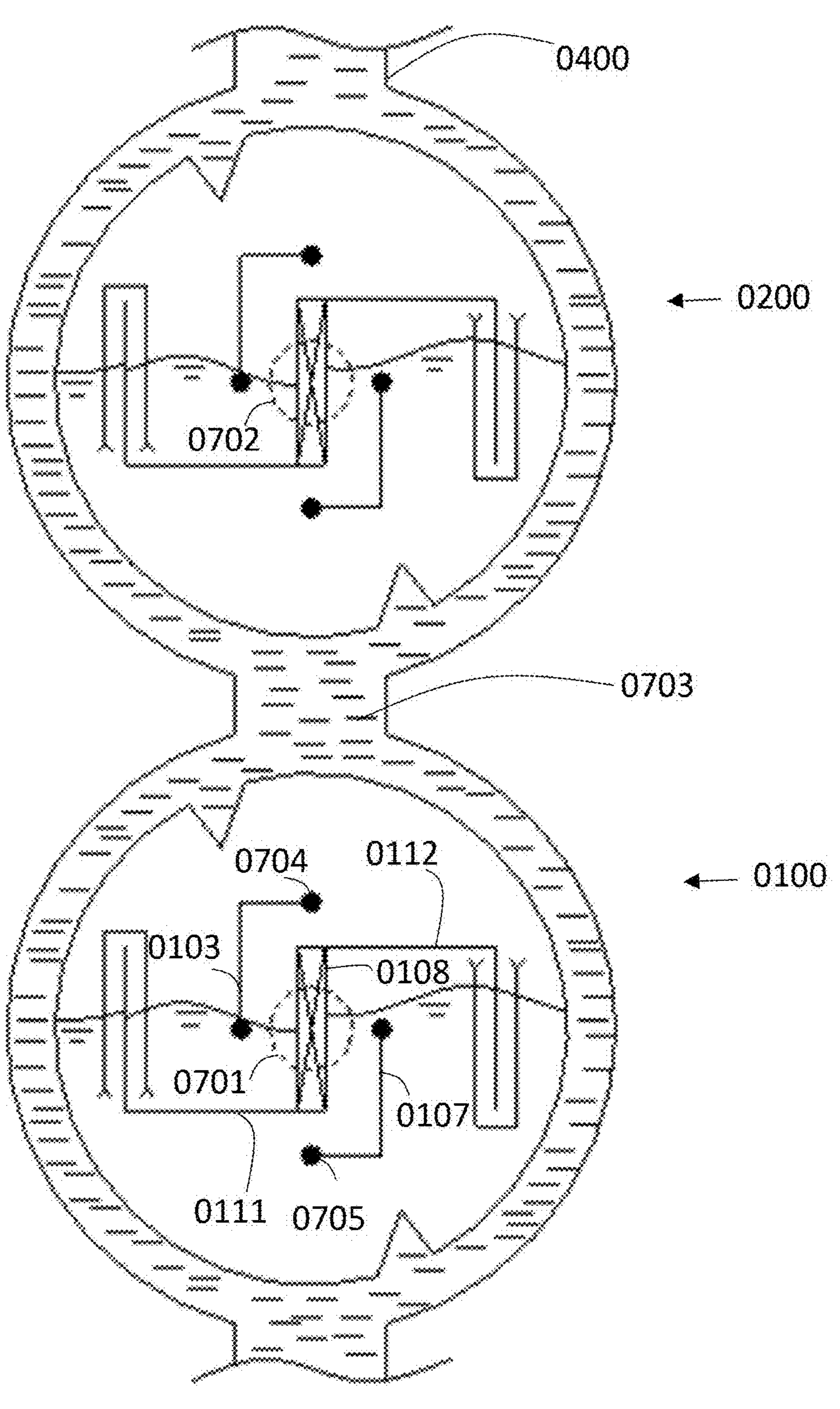
FIG. 8. is a schematic diagrammatic conceptual elevation view of a vertically stacked system of electrochemical cells achieving heat integration, with batch type operation, with individually rotatable cells, shown in a first position during electricity generation, according to an embodiment.

According to an embodiment, as shown in FIG. 8, electrochemical device system 0011 comprises vertically stacked concentration cells 0100 and 0200 that achieve heat integration, with batch type operation, with cells 0100 that are individually rotatable.

FIG. 8. shows concentration cells 0100 and 0200 during electricity generation, according to an embodiment.

According to an embodiment, as shown in FIG. 8, concentration cells 0100 and 0200 are each independently rotatable about their respective horizontal axes within column 0400 by shafts 0701 and 0702 respectively. According to an embodiment, as shown in FIG. 8, concentration cells 0100 and 0200 are rotatable counterclockwise in the view of FIG. 8. According to an embodiment, column 0400 includes a heat transfer fluid 0703 in which concentration cells 0100 and 0200 are immersed, which may permit thermal integration between concentration cells 0100 and 200 (and the heat source below).

According to embodiment, as shown in FIG. 8, concentration cell 0100 includes surface 0101, first divider 0111, first electrolyte 0103, first electrode 0104, second divider 0112, second electrolyte 0106, second electrode 0107, ion exchange membrane 0108, first tube 0113, second tube 0114. Cell 0200 is similar.

According to embodiment, as shown in FIG. 8, concentration cell 0100 includes a divider arrangement that differs somewhat from the embodiments described earlier. Heat applied below concentration cell 0100 via heat transfer fluid 0703 causes second electrolyte 0106 to boil and the vapour thus generated flows to the top of cell 0100 and condenses, transferring heat to cell 0200 via heat transfer fluid 0703. Within cell 0100 condensate drips from an indent on the upper surface and flows to first divider 0111. First electrode 0104 and second electrode 0107 may be joined to wires that pass through envelope 0013 of column 0400 and connect to an external electrical load (not shown). The embodiment shown in FIG. 8 is one example of a divider arrangement that can be rotated CCW, CCW, and so on (or in other similar embodiments CW, CW, and so on); a rotary union for wiring connections may facilitate such a rotation sequence.

Concentration cell 0100 and 0200 may be rotated in unison by shafts 0701 and 0702, due to a linkage mechanism such as v-belt, a roller chain and sprocket, gears, or a rack and pinion (not shown). According to an embodiment, as shown in FIG. 8, shaft 0701 or 0702 do not enter concentration cell 0100 and 0200, but rather are fixed to the exterior of concentration cell 0100 and 0200 respectively, and can rotate the entirety of concentration cell 0100 or 0200 about their respective horizontal axes. Ion exchange membrane 0108 is within concentration cell 0100. According to an embodiment, as shown in FIG. 8, ion exchange membrane 0108 is in front of shaft 0701. Ion exchange membrane 0108 may be at an interface between dividers 0111 and 0112.

Figure 9:
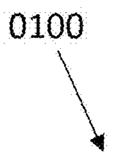
FIG. 9. is a schematic diagrammatic conceptual elevation view of cell with rotatable internals, according to an embodiment.
Figure 9:
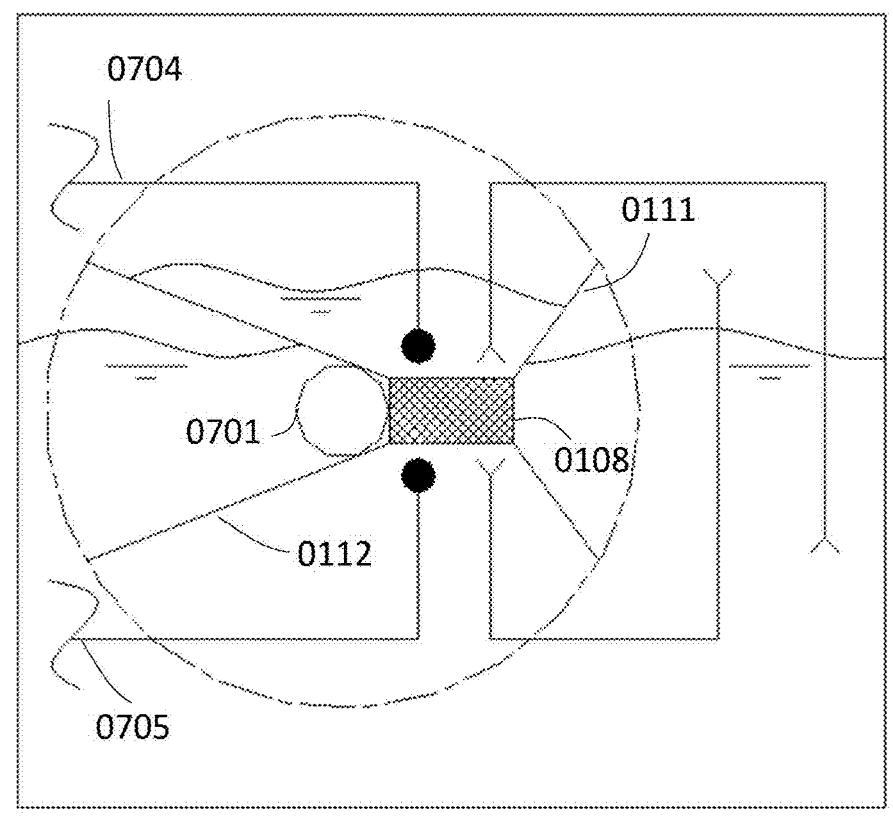

According to an embodiment, as shown in FIG. 9, electrochemical device system 0011 comprises concentration cell 0100 comprising rotatable internal components.

According to an embodiment, as shown in FIG. 9, concentration cell 0100 is thermally integrated with other cells. Rather than invert the entire cell to redistribute electrolyte (and reposition electrodes) such as in an embodiment as described in FIG. 2 through 4, the internals of the cell 0100 may be inverted while concentration cell envelope 0013 remains stationary.

According to an embodiment, as shown in FIG. 9, concentration cell 0100 comprises surface 0001, first divider 0111, first electrolyte 0103, first electrode 0104, second divider 0112, second electrolyte 0106, second electrode 0107, ion exchange membrane 0108, first tube 0113, and second tube 0114.

According to an embodiment, as shown in FIG. 9, concentration cell 0100 comprises horizontal shaft 0701 which protrudes through envelope 0013 of cell 0100. First divider 0111, first electrode 0104, second divider 0112, second electrode 0106, ion exchange membrane 0108, first tube 0113, and second tube 0114 may be connected to horizontal shaft 0701. When horizontal shaft 0701 is rotated 180 degrees in the direction indicated, all items connected thereto may be rotated about the vertical axis of horizontal shaft 0701 which may be a rotation by 180 degrees, and redistribution of electrolytes 0103 and 0106 (and repositioning of electrodes 0104 and 0107) may occur.

According to embodiment, as shown in FIG. 9, first electrode 0104 may be connected to an electrical connector 0704 (within concentration cell 0100). Second electrode 0107 may be connected to an electrical connector 0705 (within concentration cell 0100). According to embodiment 7, each of the electrical connectors 0704 and 0705 may be flexible, with sufficient length and slack to permit rotation of shaft 0701, and with sufficient length and slack to pass through envelope 0013 of concentration cell 0100 to enable connection with an external electrical load (not shown). The connectors 0704 and 0705 may be arranged or fabricated from appropriate material so as not to become corroded. In other embodiments, connectors 0704 and 7005 may be integrated into shaft 0701.

According to an embodiment, as shown in FIG. 9, concentration cell 0100 internals may be first rotated counterclockwise. Following counterclockwise rotation, concentration cell 0100 may be rotated clockwise. According to an embodiment, subsequent rotation of concentration cell 0100 may follow a CCW, CW, CCW, and so on, pattern.

An advantage of the embodiment of FIG. 2 through 4 over the embodiment of FIG. 9 may be the lack of protrusions (and related seals, and related costs) that are necessitated by shaft 0701 of the embodiment of FIG. 9. In some embodiments, rotation of internals may be achieved by magnetic actuator, to avoid or mitigate envelope 0013 protrusions for example.

According to an embodiment, as described in FIG. 9, dividers 0111 and 0112 are offset from shaft 0701, and therefore dividers 0111 and 0112 are offset from the centre of concentration cell 0100. In other embodiments, divider 0111 and 0112 geometry similar to that of FIG. 9 may be employed in a cell 0100 wherein such dividers 0111 and 0112 may rotate in unison with the cell 0100 (in a manner similar to the embodiment of FIG. 2).

According to an embodiment, as described in FIG. 9, the semi-conical geometry of divider 0111 and 0112 geometry permit such to be "lifted" above liquid level during rotation, which enhances emptying of divider 0112.

Figure 10:
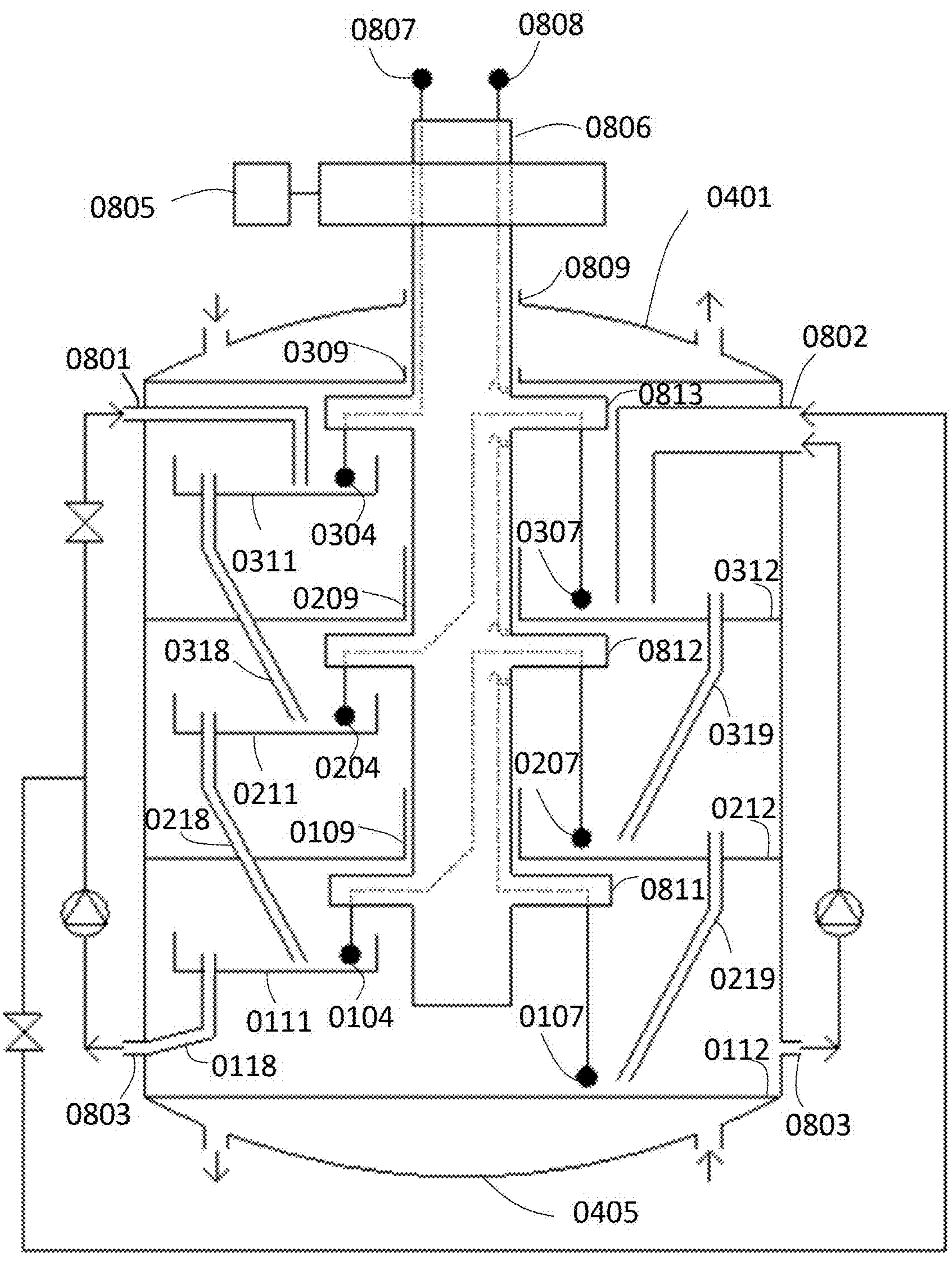
FIG. 10. is a schematic diagrammatic conceptual elevation view of a vertically stacked system of electrochemical cells achieving heat integration, with continuous operation, showing electrodes in first position, according to an embodiment.
Figure 11:
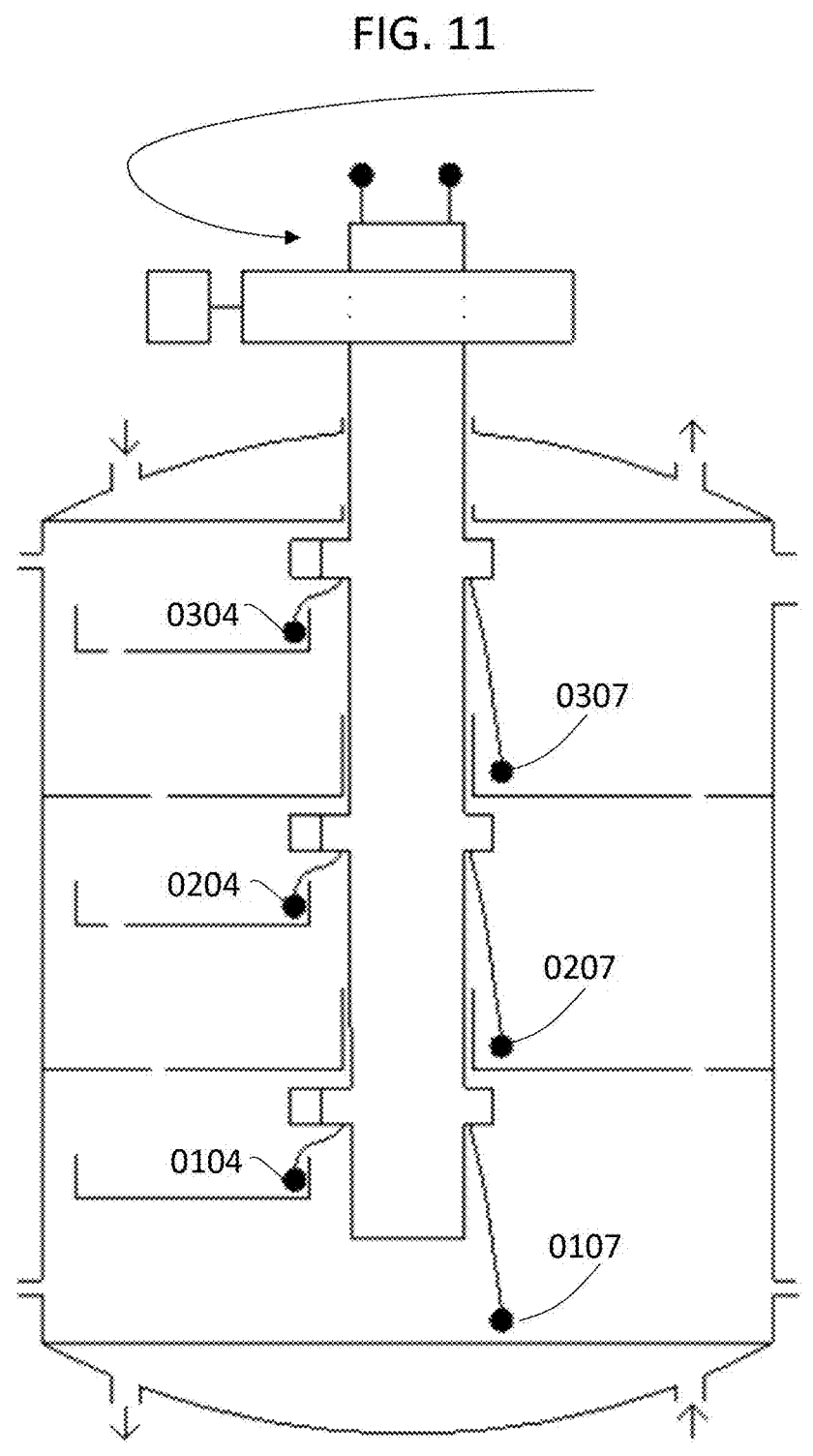
Figure 12:
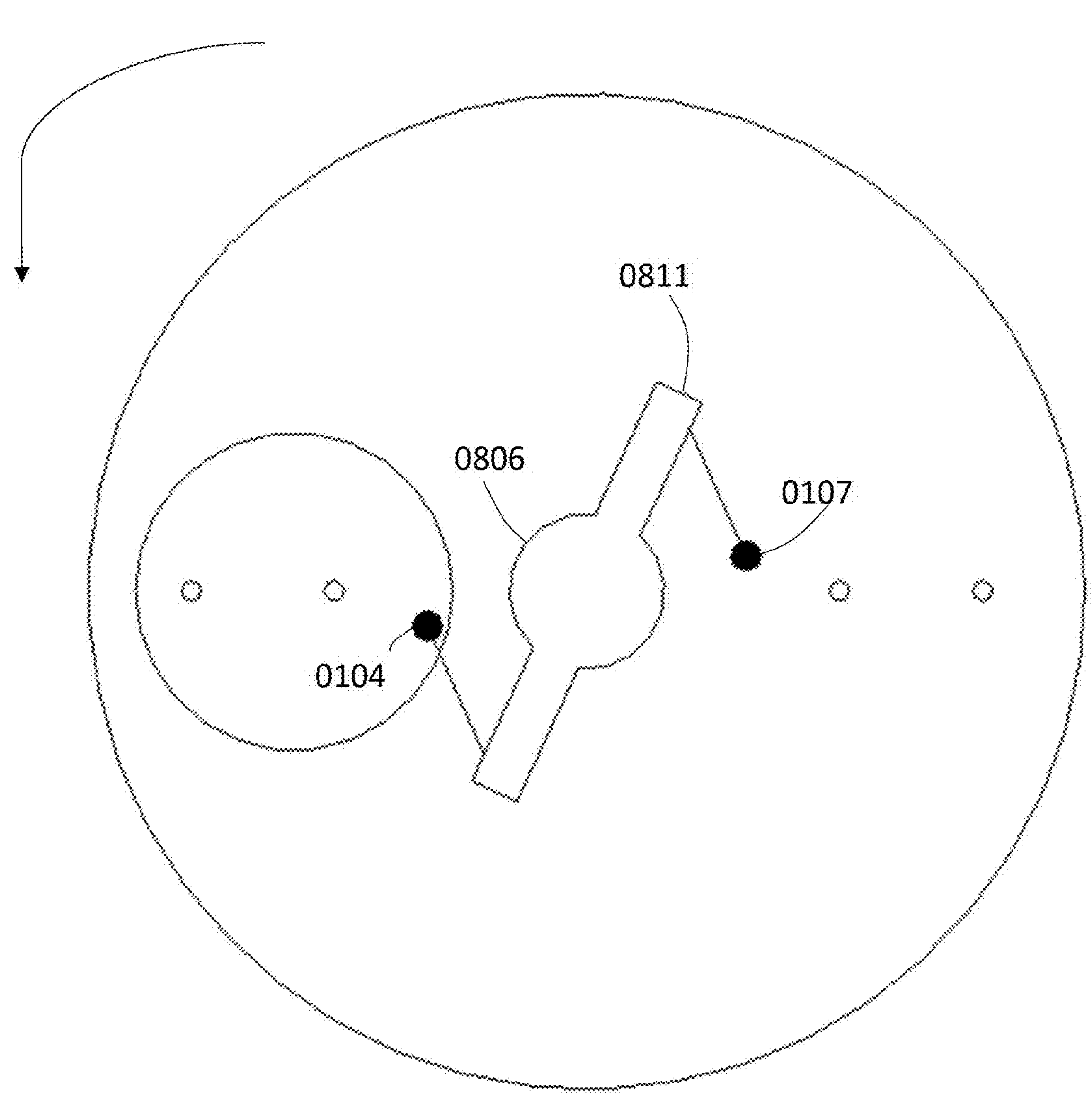
FIG. 12. is a schematic diagrammatic conceptual sectional plan view of a cell of a vertically stacked system of electrochemical cells achieving heat integration, with continuous operation, showing electrodes during relocation, with some components omitted for clarity, according to an embodiment.

According to an embodiment, as described in FIGS. 10 through 12, concentration cells 0100, 0200, and 0300 (which may be identical) are vertically stacked to achieve heat integration, with continuous operation. Periodically, electrodes 0104 and 0107 may be relocated by virtue of linkage to, and rotation of, a central vertical shaft 0701.

According to an embodiment, as described in FIGS. 10 through 12, an external fluid inlet port 0406 and an external fluid outlet port 0407, communicate with an external fluid chamber 0405, which is located at the bottom of column 0400, and adjacent to, and thermally integrated with, cell 0100. Ports 0406 and 0407 may be used to allow an external heating fluid to transfer heat to the system. At the top of column 0400, external coolant inlet port 0402 and external coolant outlet port 0403 may remove heat from the system via external coolant chamber 0401.

According to embodiment, as described in FIGS. 10 through 12, cell 0100 comprises surface 0001, first divider 0111, first electrolyte 0103, first electrode 0104, second divider 0112, second electrolyte 0106, second electrode 0107, ion exchange membrane 0108, first tube 0113, second tube 0114, shaft sealing weir 0109.

According to embodiment, as described In FIGS. 10 through 12, cell 0200 comprises surface 0101, first divider 0211, first electrolyte 0203, first electrode 0204, second divider 0212, second electrolyte 0206, second electrode 0207, ion exchange membrane 0208, first tube 0213, second tube 0214, and a shaft sealing weir 0209.

According to embodiment, as described in FIGS. 10 through 12, cell 0300 comprises surface 0201, first divider 0311, first electrolyte 0303, first electrode 0304, second divider 0312, second electrolyte 0306, second electrode 0307, ion exchange membrane 0308, first tube 0313, second tube 0314, and a shaft sealing weir 0309.

According to embodiment, as described In FIGS. 10 through 12, at the top of column 0400, heat transfer between external coolant chamber 0401 and concentration cell 0300 may be possible via surface 0301. At the bottom of column 0400, heat transfer between heating chamber 0405 and concentration cell 0100 may be possible via surface 0001.

At the top of column 0400, first top port 0801 and second top port 0802 may allow fluid into concentration cell 0300. At the bottom of column 0400, first bottom port 0803 and second bottom port 0804 receive fluid from concentration cell 0100.

According to an embodiment, as described in FIGS. 10 through 12, rotary actuator 0805 is linked to shaft 0806 and rotates shaft 0806 periodically by 180 degrees, alternating in a CW, CCW, CW manner, so as to alternate electrode function and maintain electrode weights within a desired range. First electrical terminal 0807 and second electrical terminal 0808 may issue from the top of shaft 0806 and may be connected to an electrical load (not shown). First electrical terminal 0807 and second electrical terminal 0808 may be electrically connected to electrodes 0304 and 0107 respectively within column 0400 via electrical connections or conductors within shaft 0806 (as will be described in paragraphs further below).

In the vicinity of concentration cell 0300, arm 0813 may be connected to shaft 0806. One extremity of arm 0813 is connected to first electrode 0304 with a length of flexible cable. Another extremity of arm 0813 is connected to second electrode 0307 with a length of flexible cable.

In the vicinity of concentration cell 0200, arm 0812 may be connected to shaft 0806. One extremity of arm 0812 may be connected to first electrode 0204 with a length of flexible cable. Another extremity of arm 0812 may be connected to second electrode 0207 with a length of flexible cable.

In the vicinity of concentration cell 0100, arm 0811 may be connected to shaft 0806. One extremity of arm 0811 may be connected to first electrode 0104 with a length of flexible cable. Another extremity of arm 0811 may be connected to second electrode 0107 with a length of flexible cable.

According to an embodiment, as shown in FIG. 10, heat is applied to electrochemical device system 0011 as will now be described to establish a concentration gradient.

According to an embodiment, as shown in FIG. 10, an external fluid enters port 0406 and exits port 0407 which provides heat to external fluid chamber 0405, which applies heat to cell 0100, via surface 0001, and causes vaporization of solvent, condensation at surface 0101, and flow of condensate to first divider 0111. As a result, second electrolyte 0106 may become more concentrated and first electrolyte 0103 may become more dilute, and furthermore, heat transfers to cell 0200. In the same manner, concentration differences are generated in cells 0200 and 0300, and thus electrical power generation from each cell is enabled.

According to an embodiment, as shown in FIG. 10, the flow of fluids will now be described.

According to an embodiment, as shown in FIG. 10, electrolyte 0103 flows to first tube 0118 and thence out of first bottom port 0803. As indicated by the flow arrows shown in FIG. 10, electrolyte from first bottom port 0803 may be returned to the top of column 0400 (e.g.—by a pump or other tool) at first top port 0801 or second top port 0802 or combination thereof.

According to an embodiment, as shown in FIG. 10, second electrolyte 0106 flows to second bottom port 0804. As indicated by the flow arrows shown in FIG. 10, the fluid from second bottom port 0804 may be returned to the top of column 0400 (e.g.—by a pump or other tool) at second top port 0802.

According to an embodiment, as shown in FIG. 10, liquid from first top port 0801 may flow to first divider 0311, where it may be joined by condensate generated in cell 0300. Liquid from first divider 0311 may flow to first tube 0318 and thence to first divider 0211, where it may be joined by condensate generated in cell 0200. Liquid from first divider 0211 may flow to first tube 0218 and thence to first divider 0211, where it may be joined by condensate generated in cell 0100. Liquid from first divider 0111 may flow to first tube 0118, and after recirculation to the top of column 0400 the cycle may repeat.

According to an embodiment, as shown in FIG. 10, liquid from second top port 0802 may flow to (the vicinity of) second divider 0312 (cell 0300), where the liquid may be concentrated by the application of heat. Liquid from second divider 0312 may flow to second tube 0319 and thence to second divider 0212 (cell 0200), where the liquid may be concentrated by the application of heat. Liquid from second divider 0212 may flow to second tube 0219 and thence to second divider 0112 (cell 0100), where the liquid is concentrated by the application of heat. Liquid from second divider 0112 flows to port 0803 and the cycle repeats.

Downward flow through the column, according to an embodiment is shown in FIG. 10. In other embodiments, upward flow through a series of first dividers may be imposed, or upward flow through a series of second dividers may be imposed, or both.

According to an embodiment, as shown in FIG. 10, electrical interconnection of electrodes will now be described. According to an embodiment, electrical conductors or connections integrated with shaft 0806 may permit series electrical connection of the electrodes of the system to the external electrical terminals, namely, first electrical terminal 0807 and second electrical terminal 0808. The system may provide electrical energy to an electrical load outside of column 0400.

According to an embodiment, as shown in FIG. 10 first electrical terminal 0807 is wired to first electrode 0304 (external to cell 0300 connection), second electrode 0307 is wired to first electrode 0204 (cell 0300 to cell 0200 connection), second electrode 0207 is wired to first electrode 0104 (cell 0200 to cell 0100 connection). According to an embodiment, second electrode 0107 is wired to second electrical terminal 0808 (cell 0100 to external connection).

According to an embodiment, as shown in FIG. 10, with each 180 degree movement of the shaft 0806, polarity of terminals 0807 and 0808 is switched and cells 0100, 0200, and 0300 are in series electrical connection. In other embodiments, other electrical connections are possible.

According to an embodiment, as shown in FIGS. 11 and 12, relocation of electrodes will now be described. FIG. 11 and FIG. 12 show shaft 0806 having been partly rotated, during the process of electrode relocation, according to an embodiment. For clarity, FIG. 11 and FIG. 12 show components related to electrode relocation, and certain components are omitted from view. Cell 0100 is discussed; cells 0200 and 0300 operate in a similar manner. The direction of rotation of shaft 0806 and various components is indicated in FIGS. 11 and 12.

Due to the rotation of shaft 0806, and by virtue of connection with arm 0811, first electrode 0104 may be dragged in a counterclockwise motion, and eventually over and down the wall of, and out of, first divider 0111, according to an embodiment. First electrode is 0104 may thusly be made to travel into second divider 0112.

Due to the rotation of shaft 0806, and by virtue of connection with arm 0811, second electrode 0107 may be dragged in a counterclockwise motion, towards first divider 0111, and eventually up and over the wall of, and into, first divider 0111, according to an embodiment. Second electrode 0107 may thusly be made to travel into first divider 0111.

According to an embodiment, as shown in FIG. 10, shaft 0806 passes through top shaft sealing port 0809 into column 0400, which may minimize coolant transmission between an environment and column 0400. According to an embodiment, as shown in FIG. 10 shaft 0806 passes through shaft sealing weir 0309, which may minimize transmission between the external coolant chamber 0401 and cell 0300. Shaft 0806 may pass through shaft sealing weir 0209, which minimizes transmission between the cells 0300 and 0200. Shaft 0806 may pass through shaft sealing weir 0109, which minimizes vapour transmission between cell 0200 and cell 0100. A variety of sealing methods are possible (e.g.—o-ring, shaft seal, stuffed seal, mechanical seal, inverted cup type liquid seal, chevron seal, etc.). In some embodiments, a mag-drive shaft, comprised of one ore multiple cylinder shaft sections, may be employed.

For sake of clear presentation, the embodiment of FIG. 10 is shown with electrodes 0104 and 0107 connected to flexible cables strung from arm 0811. In other embodiments, a mechanism with rigid members or guides or articulating joints may be employed to cause the electrodes 0104 and 0107 to move desirably.

In some embodiments, cells 0100, 0200, 0300 are stacked in vertical alignment, such that each has the same appearance in plan view; in other embodiments, cells 0100, 0200, and 0300 are stacked out of vertical alignment, such that adjacent cells have an appearance in plan view that is rotated relative to each other, for example by 90 or 180 degrees. In some embodiments, stacking or divider or flowrate arrangements may be implemented such that they may increase residence time in cells, in others such that they may reduce residence time in cells.

According to an embodiment, as shown in FIG. 10, spent streams issuing from the column are recycled to the column 0400, and fluids are contained within the column 0400 system. In some embodiments, fresh streams are fed to the column and discharge streams are not recycled, or only partially recycled. In some such embodiments, electrochemical energy can be extracted from a dilute external stream and concentrated external stream that would otherwise have been blended with no benefit. In some embodiments, heat from fresh streams fed to the column 0400 provide energy that is used to generate concentration potential differences. For example, a fresh stream may undergo transfer heat to at the bottom of the column 0400 before being transferred to the top of the column.

According to an embodiment, as shown in conceptual views of FIG. 13 through 17, a cell 0100 vertically stacked within a column 0400 including concentration cells 0100 (and others like it) achieving heat integration, with batch type operation is described. Accordingly, the system may provide cost effective conversion of heat to electricity and energy storage.

Figure 13:
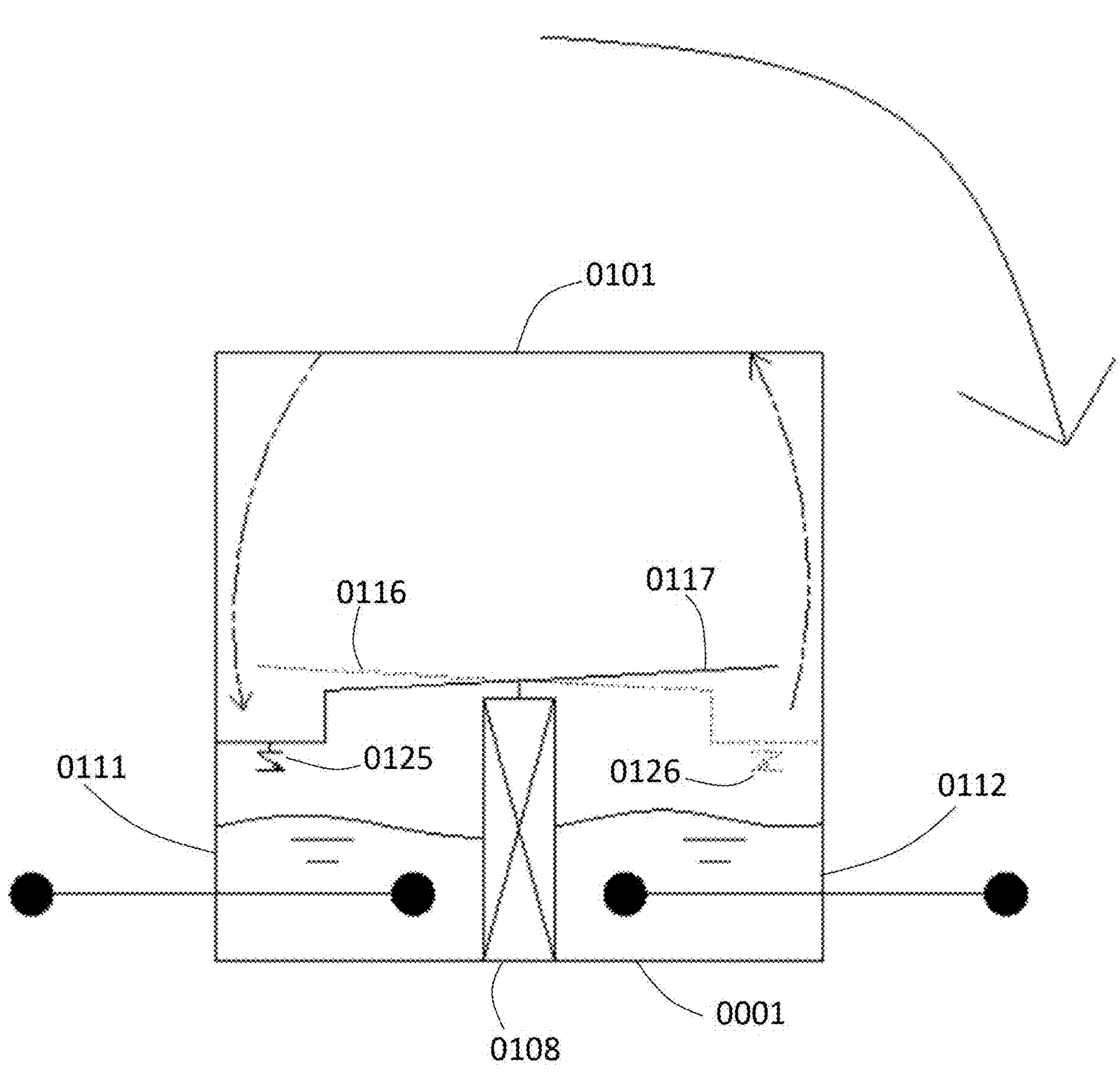
FIG. 13. is a schematic diagrammatic conceptual elevation view of a cell of a vertically stacked system of electrochemical cells achieving heat integration, with batch type operation, in a first orientation, according to an embodiment.
Figure 14:
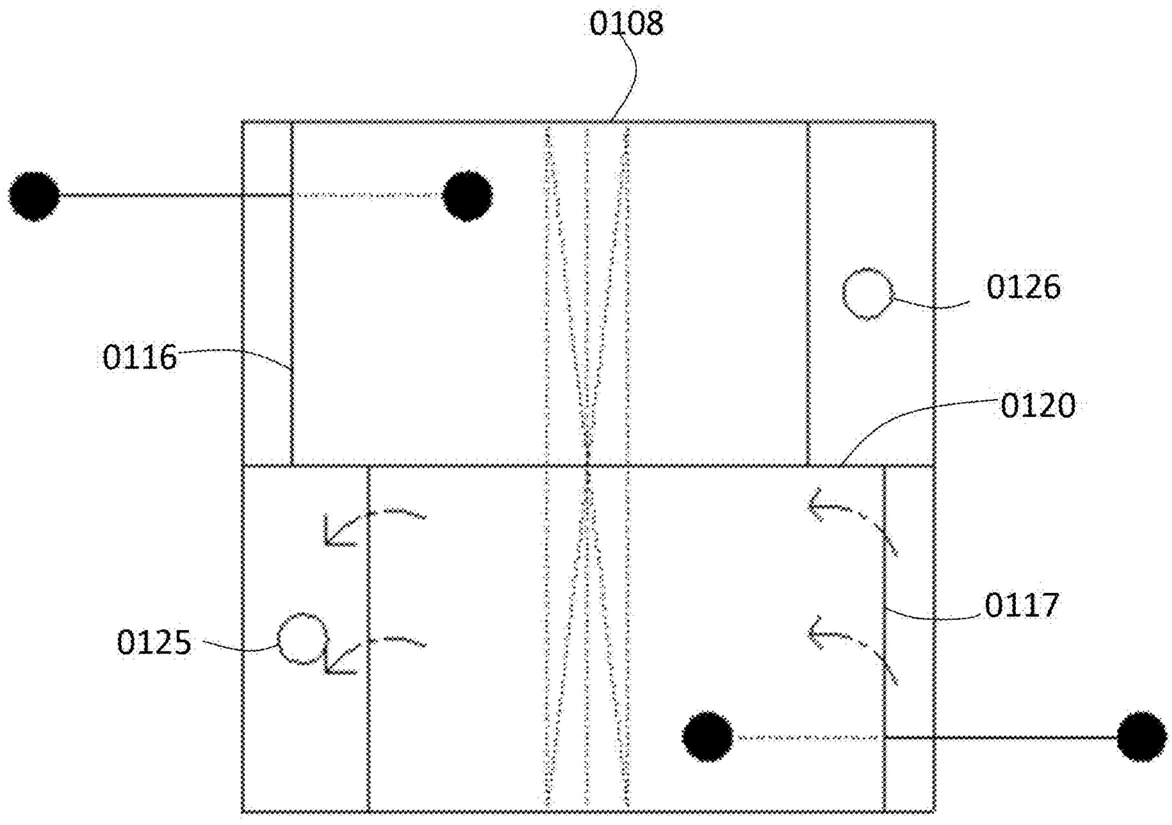
FIG. 14. is a schematic diagrammatic conceptual plan view of a cell of a vertically stacked system of electrochemical cells achieving heat integration, with batch type operation, in a first orientation, according to an embodiment.
Figure 15:
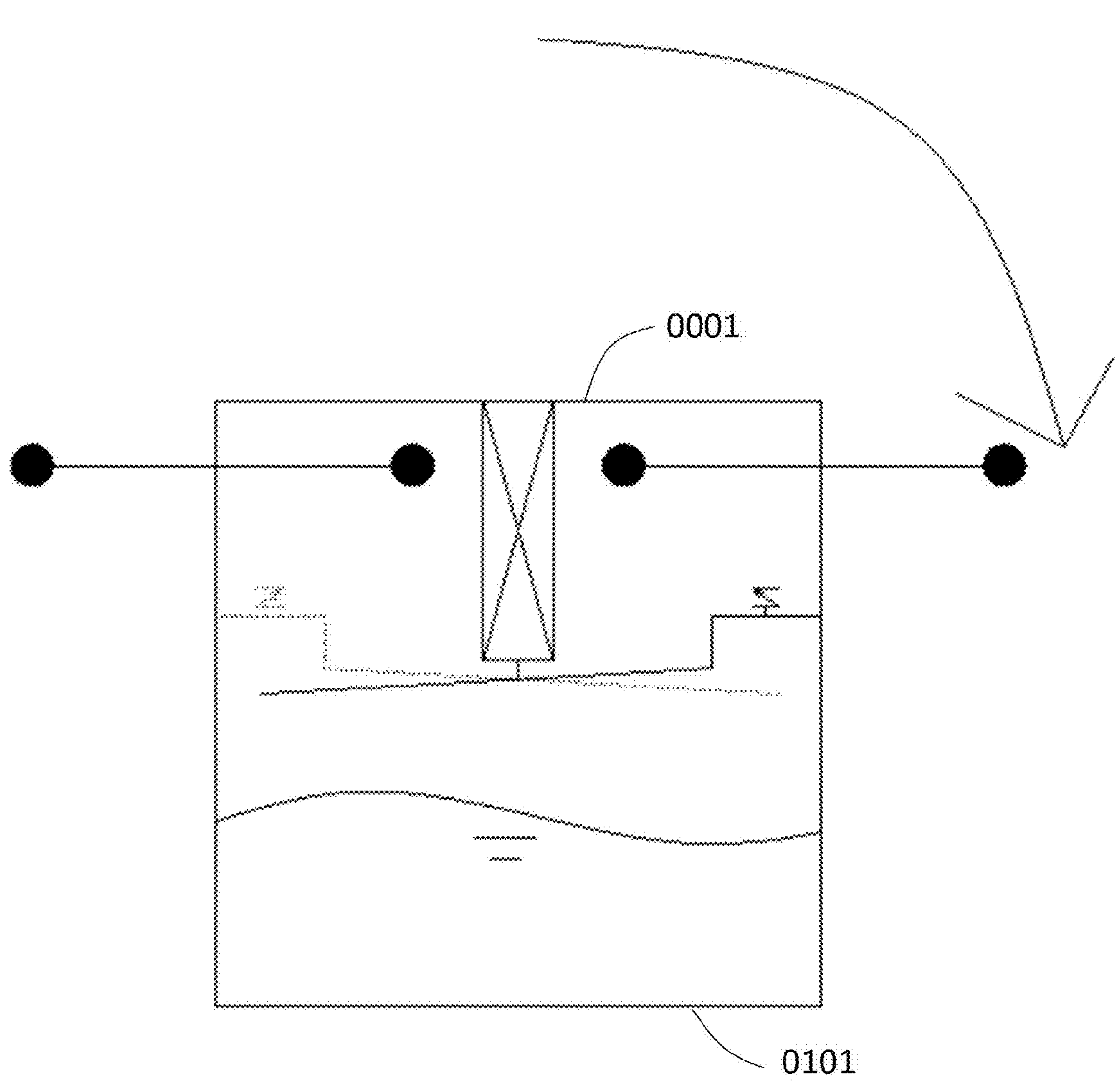
FIG. 15. is a schematic diagrammatic conceptual elevation view of a cell of a vertically stacked system of electrochemical cells achieving heat integration, with batch type operation, in a second orientation, according to an embodiment.

A first orientation (for heating or electrochemical operation) is shown in elevation and plan in FIGS. 13 and 14 respectively (with vapour and condensate flow in phantom lines), according to an embodiment. A second orientation (during electrolyte redistribution and cell inversion) is shown in elevation in FIG. 15, according to an embodiment. A third orientation (after electrolyte redistribution and in the subsequent heating) is shown in elevation and plan in FIGS. 16 and 17 respectively (with vapour and condensate flow in phantom lines), according to an embodiment.

According to an embodiment, as shown in FIG. 13, cell 0100 includes surface 0001, surface 0101, first divider 0111, first electrolyte 0103, first electrode 0104, second divider 0112, second electrolyte 0106, second electrode 0107, ion exchange membrane 0108, first plate 0116, second plate 0117, partition 0120, first check valve 0124, second check valve 0125.

Heat application will be described with reference to FIGS. 13 and 14, according to an embodiment. Heat applied at surface 0001 vapourizes liquid from second divider 0112 and vapour flow is channeled to surface 0101 by partition 0120 and second plate 0117. Condensate may be formed at surface 0101 and may flow to second plate 0117 thence to first check valve 0121 thence to first divider 0111.

After heat application is completed, electrochemical operation may occur in the orientation of FIG. 13, according to an embodiment. After electrochemical operation, fluid redistribution is initiated by rotating concentration cell 0100 180 deg. in the direction indicated in FIG. 13, after which the orientation of FIG. 15 may be achieved. Concentration cell 0100 may then be rotated a further 180 deg. in the direction indicated in FIG. 15, after which the orientation of FIG. 16 may be achieved, according to an embodiment.

Further heat application will be described with reference to FIGS. 16 and 17, according to an embodiment. According to an embodiment, heat applied at surface 0001 vapourizes liquid from first divider 0111 and vapour flow is channeled to surface 0101 by partition 0120 and first plate 0116. Condensate formed at surface 0101 may flow to first plate 0116 thence to second check valve 0122 thence to second divider 0112.

Figure 16:
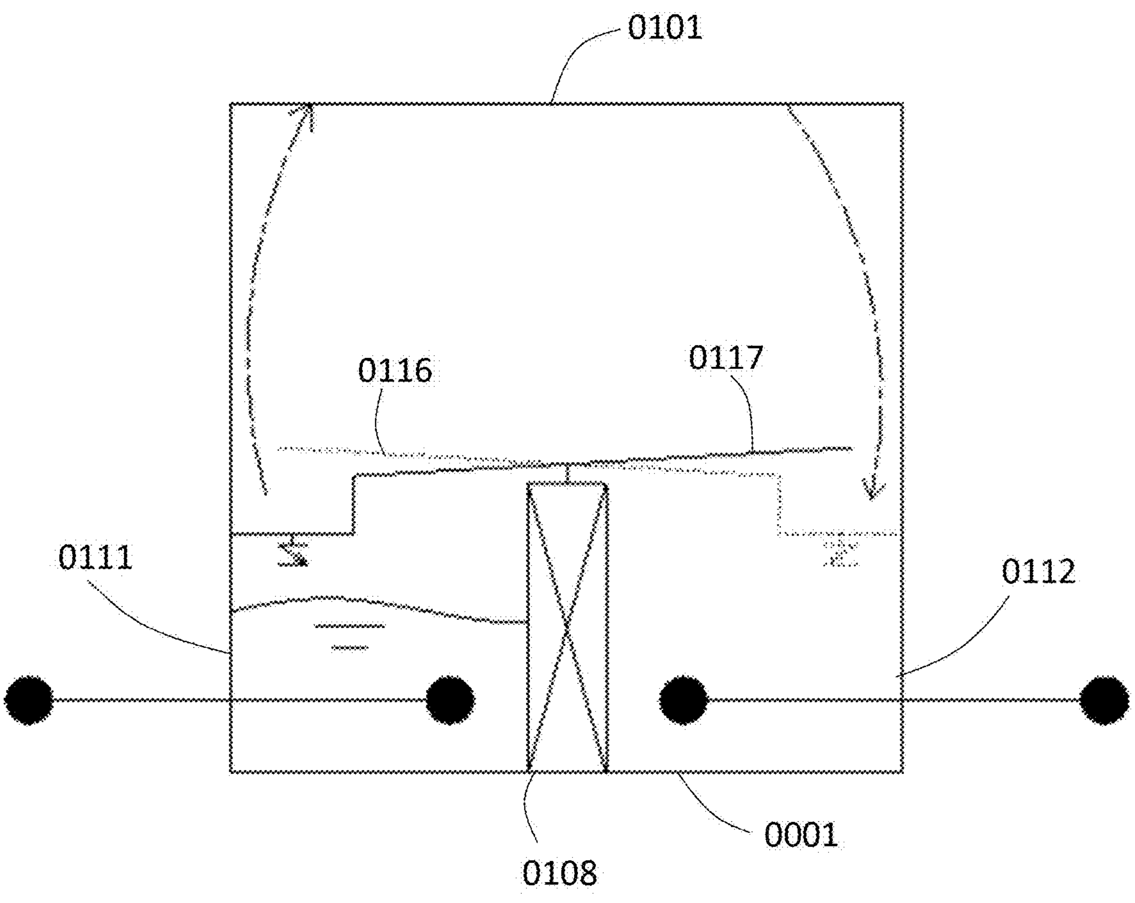
FIG. 16. is a schematic diagrammatic conceptual elevation view of a cell of a vertically stacked system of electrochemical cells achieving heat integration, with batch type operation, in a third orientation, according to an embodiment.
Figure 17:
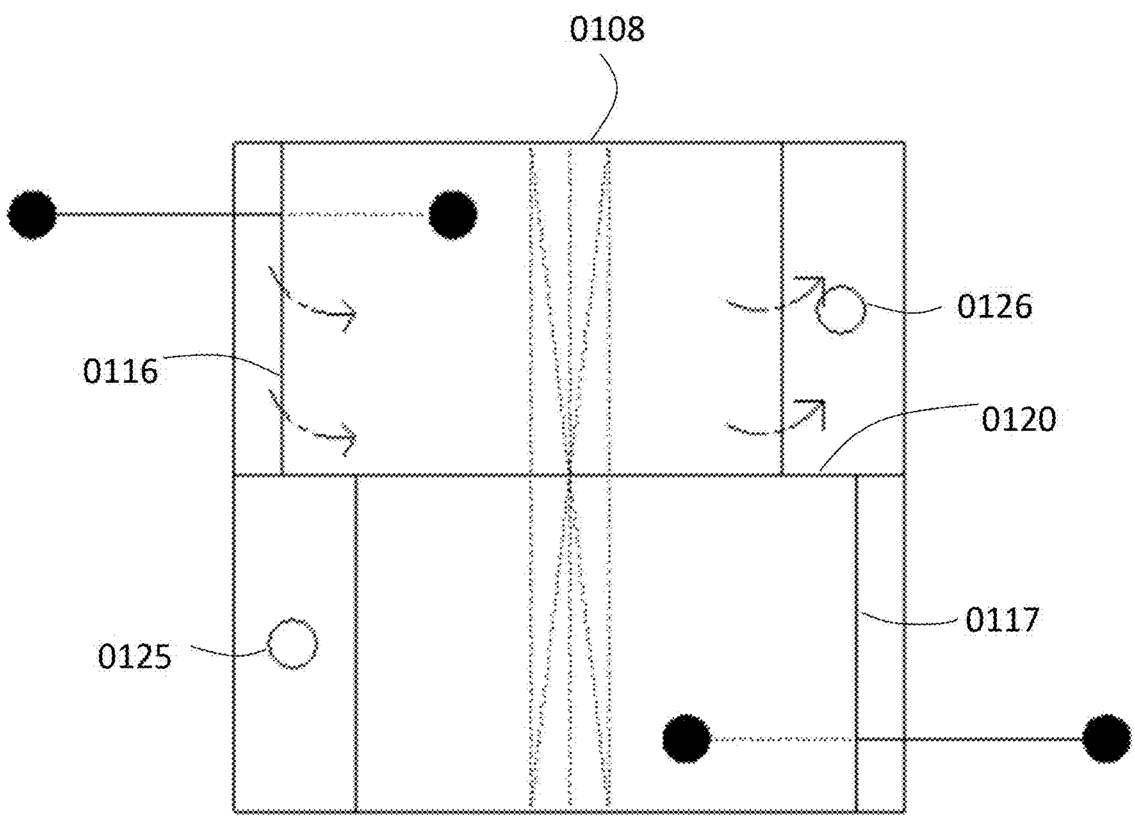
FIG. 17. is a schematic diagrammatic conceptual plan view of a cell of a vertically stacked system of electrochemical cells achieving heat integration, with batch type operation, in a third orientation, according to an embodiment.

After heat application is completed, electrochemical operation may occur in the orientation of FIG. 16. After electrochemical operation, fluid redistribution may be initiated by rotating the cell 360 degrees in the direction opposite that shown in FIG. 13, according to an embodiment.

The embodiment described in FIG. 13 through 17 employs check valves. In some alternative embodiments flaps or hinged plates may be employed.

The embodiment described in FIG. 13 through 17 operates in batch mode. In some embodiments, an analogous system may operate in a continuous mode. In some analogous embodiments with stacked cells, series electrical connection of electrodes within a column 0400 is possible.

In some embodiments analogous to the embodiment described in FIG. 13 through 17, an unbalanced fluid distribution can be employed to assist or accomplish during column tilt or rotation. In some embodiments analogous to the embodiment described in FIG. 13 through 17, heat from the column or heat source may pressurize a fluid that drives an actuator that accomplishes column tilt or rotation.

In some embodiments analogous to the embodiment described in FIG. 13 through 17, packing may direct vapour flow in a desired direction, while maintaining a path for liquid during electrolyte redistribution. A flap(s) or check valve(s) may also be incorporated to serve or assist this purpose (e.g.—to prevent vapour from traversing the packing area during heating).

In an embodiment, as shown in FIG. 13 through 17, during heating, within cell 0100, due to the partition 0120, vapour preferentially flows to half of the surface 0101 (at the top of the cell 0100). In some embodiments, cell 0200, located above cell 0100, may be placed a position rotated relative to cell 0100 by 90 degrees about a common vertical axis of cell 0100 and 0200, so as to align the divider 0212 (the region of cell 0200 to be heated) above the portion of surface 0101 (of cell 0100) where condensation occurs.

Figure 18:
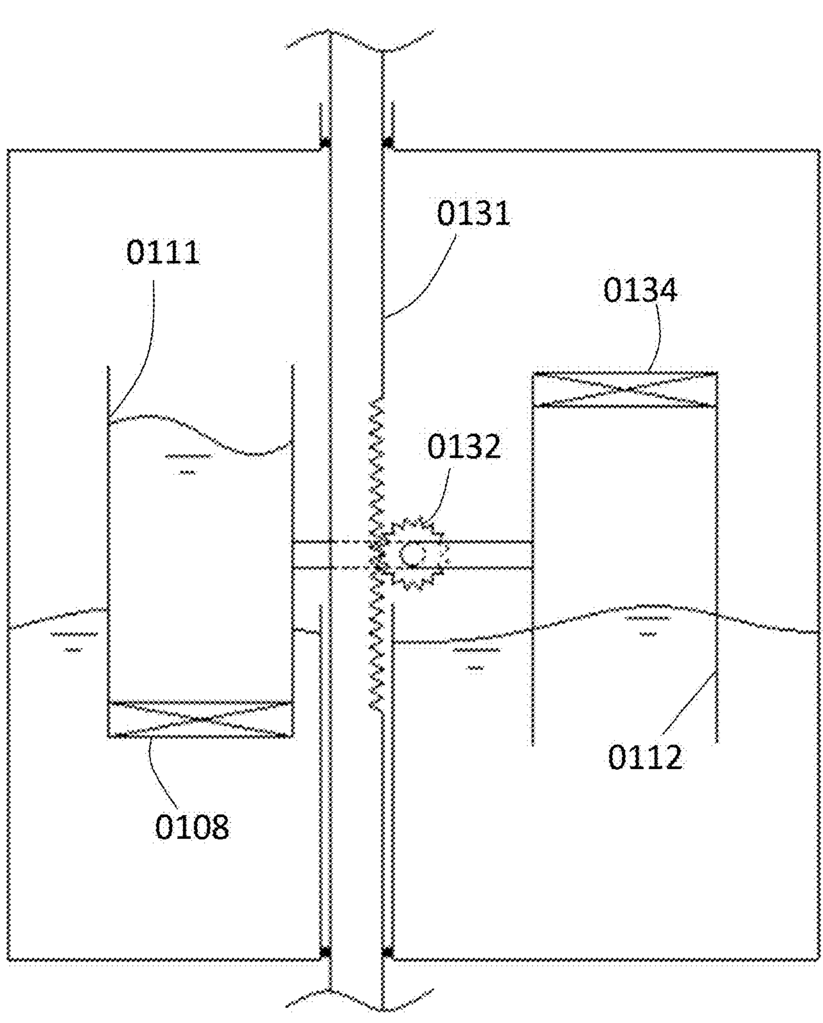
FIG. 18. is a schematic diagrammatic conceptual sectional elevation view of a cell of a vertically stacked system of electrochemical cells achieving heat integration, with batch type operation, with divider rotatable by a pinion, according to an embodiment.

According to an embodiment, as shown in FIG. 18, a cell 0100 of a column 0400 achieving heat integration, with batch type operation, with dividers rotatable by a pinion is described. Accordingly, the system may provide cost effective conversion of heat to electricity, energy storage, etc.

According to an embodiment, as shown in FIG. 18, cell 0100 electrochemical device system 0011 comprises concentration cell 0100, first divider 0111, second divider 0112, a first ion exchange membrane 0108, a second ion exchange membrane 0134, a rack-shaft 0131, pinion 0132.

According to an embodiment, as shown in FIG. 18, rack shaft 0131 passes through openings in the cell 0100 (sealed by weirs or o-ring seals). Vertical motion of rack shaft 0131 turns pinion 0132. Pinion 0132 may be linked to dividers 0111 and 0112 and may rotate dividers 0111 and 0112 about pinion 0132. According to an embodiment, the pinion is rotated 180 deg. CW, then subsequently 180 deg. CCW.

According to an embodiment, as shown in FIG. 18, first divider 0111 is linked to first ion exchange membrane 0108 and second divider 0112 is linked to second ion exchange membrane 0134. Only the immersed membrane may allow ion transfer between dividers 0111 and 0112 during electrochemical operation.

According to an embodiment, electrodes are not shown in FIG. 18 for clarity; flexible electrical connections to electrodes may be required to accommodate movement.

According to an embodiment, as shown in FIG. 18, concentration cell 0100 may be rotated in succession as follows: 180 deg. CCW, 180 deg. CCW, and so on; or alternatively, the cell 0100 may be rotated in succession as follows: [180 deg. CCW, 360 deg. CW, 180 deg. CCW] or [180 deg. CCW, 360 deg. CW, 180 deg. CCW], and so on. In view of this, the following paragraph describes an embodiment with internals that rotate in unison with the cell 0100, to avoid rotary electrical connections.

The embodiment shown in FIG. 18 employs a stationary concentration cell 0100 with rotatable internal; an embodiment with a similar divider arrangement may be employed in a cell 0100 that includes internals that rotate in unison with concentration cell 0100.

Figure 19:
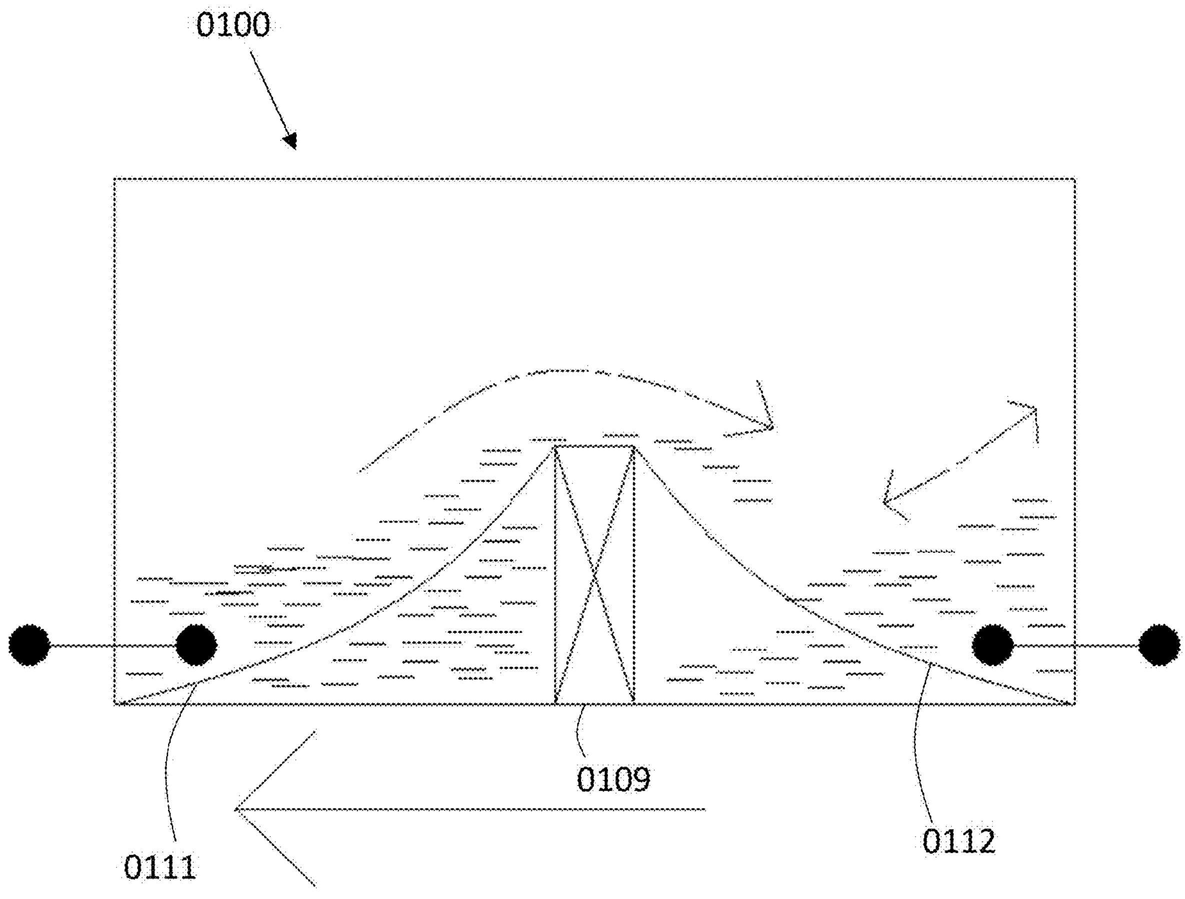
FIG. 19. is a schematic diagrammatic conceptual sectional elevation view of a cell achieving electrolyte distribution by jolting, according to an embodiment.

According to an embodiment, as shown in FIG. 19, a cell achieving electrolyte distribution by jolting is described. Accordingly, electrochemical device system 0011 may provide cost effective conversion of heat to electricity, energy storage, etc.

According to an embodiment, as shown in FIG. 19, a sudden application of force (jolt) to cell 0100 in a certain direction may transfer liquid from one divider to another.

According to an embodiment, as shown in FIG. 19, concentration cell 0100 comprises surface 0001, first divider 0111, first electrolyte 0103, first electrode 0104, second divider 0112, second electrolyte 0106, second electrode 0107, ion exchange membrane 0108.

According to an embodiment, as shown in FIG. 19, a jolt (force or impulse) imparted to concentration cell 0100 (leftwards in FIG. 16) may cause first electrolyte 0103 to flow up and over first divider 0111 and into the second divider 0112. The flow path of liquid (due to the jolt) is indicated by arrows in FIG. 16, according to an embodiment. After the power cycle that follows, a jolt may be imparted in in the direction opposite the prior jolt (i.e.—rightwards in the view of FIG. 16), to transfer electrolytes 0103 and 0107 or mixture thereof, and after subsequent vaporization from the appropriate divider 0111 or 0112, electrode polarity may be reversed in a subsequent power cycle.

According to an embodiment, as shown in FIG. 19, each of dividers 0111 and 0112 are porous and include a curved surface; above the curved surface and pores a bulk of electrolyte 0104 or 0107 is retained, and below the curved surface is a porous region through which electrolyte 0104 or 0107 may communicate with the ion exchange membrane 0108. According to an embodiment, this arrangement may allow jolting to transfer the bulk of electrolyte 0104 or 0107 along the curved surface, and thence up and over ion exchange membrane 0108. Pores in dividers 0111 and 0112 may allow solution to communicate with ion exchange membrane 0108 and thus electrochemical operation may be enabled. FIG. 19 presents a simplified arrangement for clarity; in other similar embodiments a variety of divider 0111 and 0112 and ion exchange membrane 0108 arrangements are possible to allow flow by jolting and electrochemical operation.

The embodiment of FIG. 19 employs a rectangular footprint. A similar embodiment is possible wherein cell 0100 has a circular footprint, and the cell is rotated joltingly about a central axis to cause electrolyte redistribution. In some embodiments, jolting may be used in combination with other electrolyte distribution techniques.

According to an embodiment, as shown in FIGS. 20 to 24, a cell 0100 of a column 0400 which achieves heat integration in a vertical orientation, and electrochemical operation in horizontal orientation is described. Accordingly, the system may provide cost effective conversion of heat to electricity and energy storage.

Figure 20:
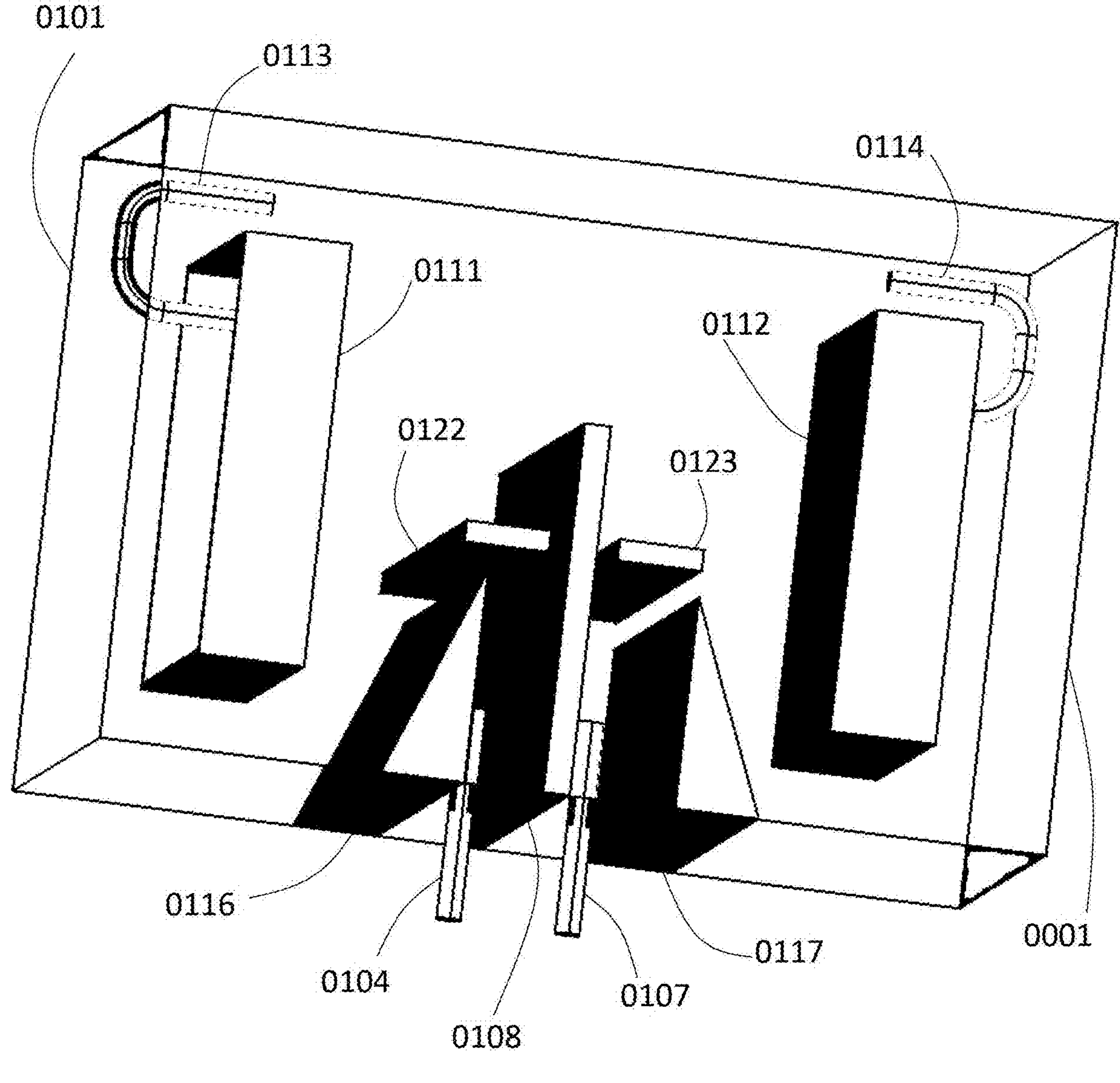
FIG. 20. is an orthographic view of a cell of a system that achieves heat integration in vertical orientation, and that operates electrochemically in horizontal orientation, according to an embodiment.
Figure 21:
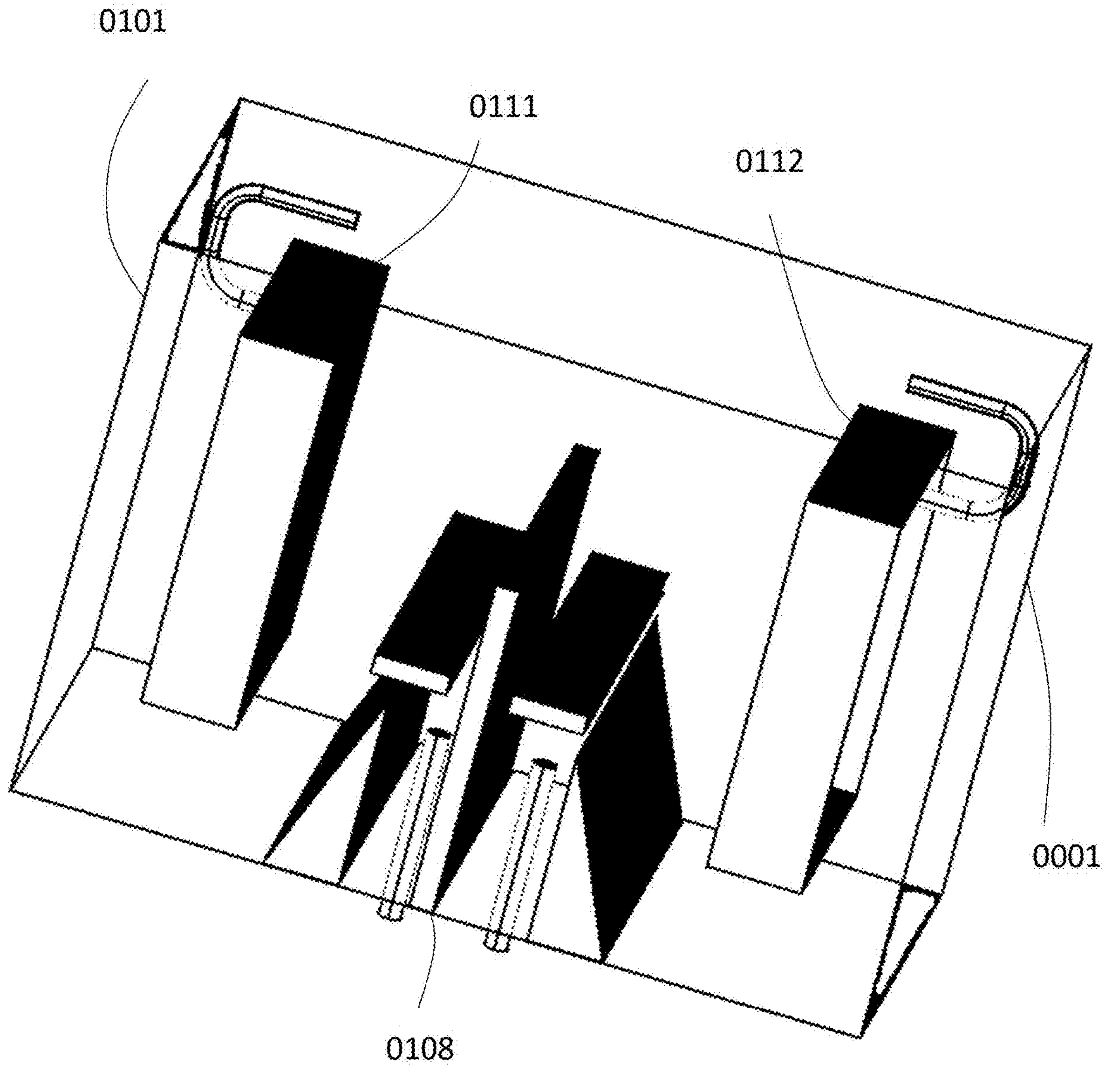
FIG. 21. is an orthographic view of a cell of a system that achieves heat integration in vertical orientation, and that operates electrochemically in horizontal orientation, according to an embodiment.
Figure 22:
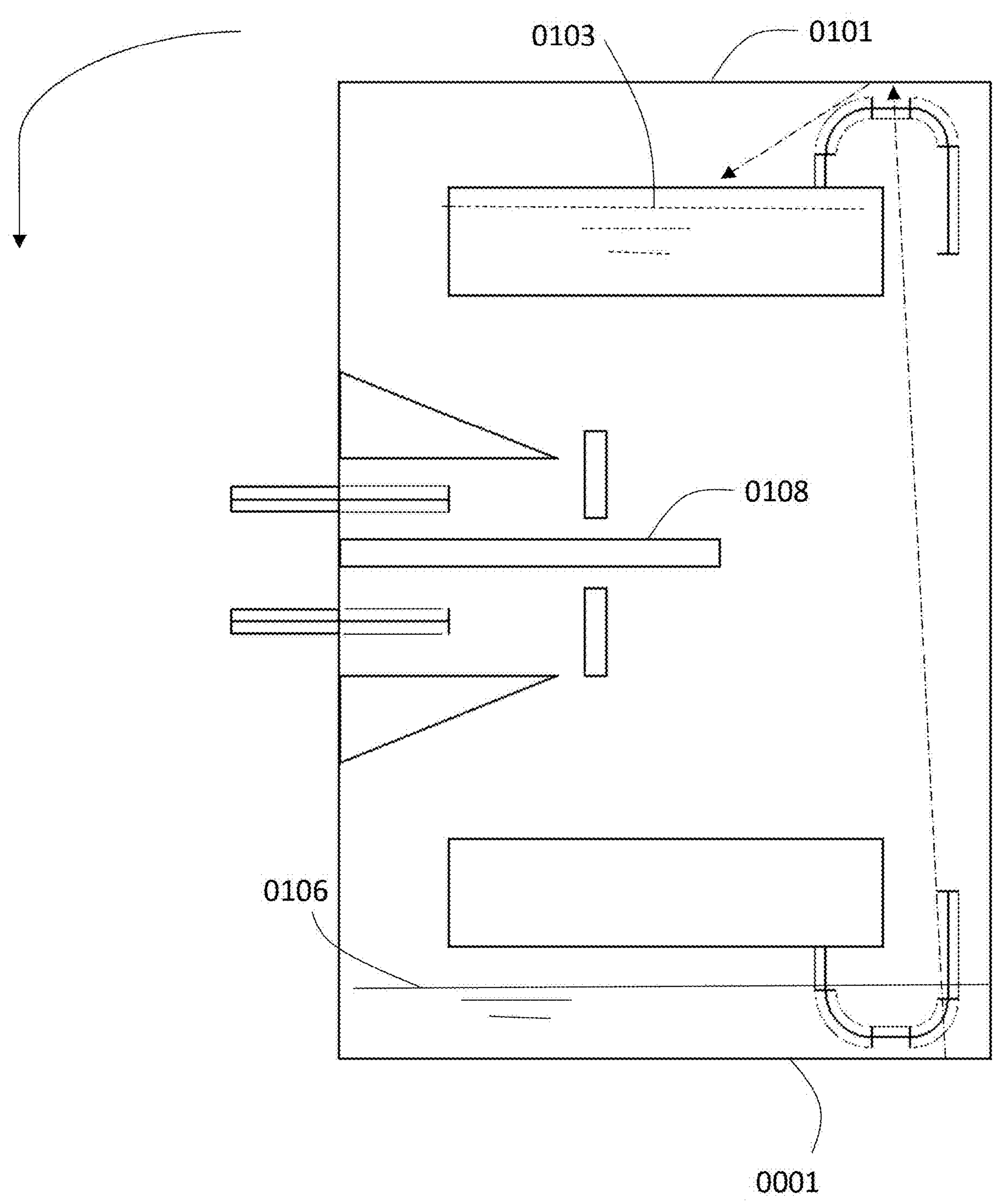
FIG. 22. is a conceptual elevation view of a cell of a system that achieves heat integration in vertical orientation, and that operates electrochemically in horizontal orientation; shown during heating, according to an embodiment.
Figure 23:
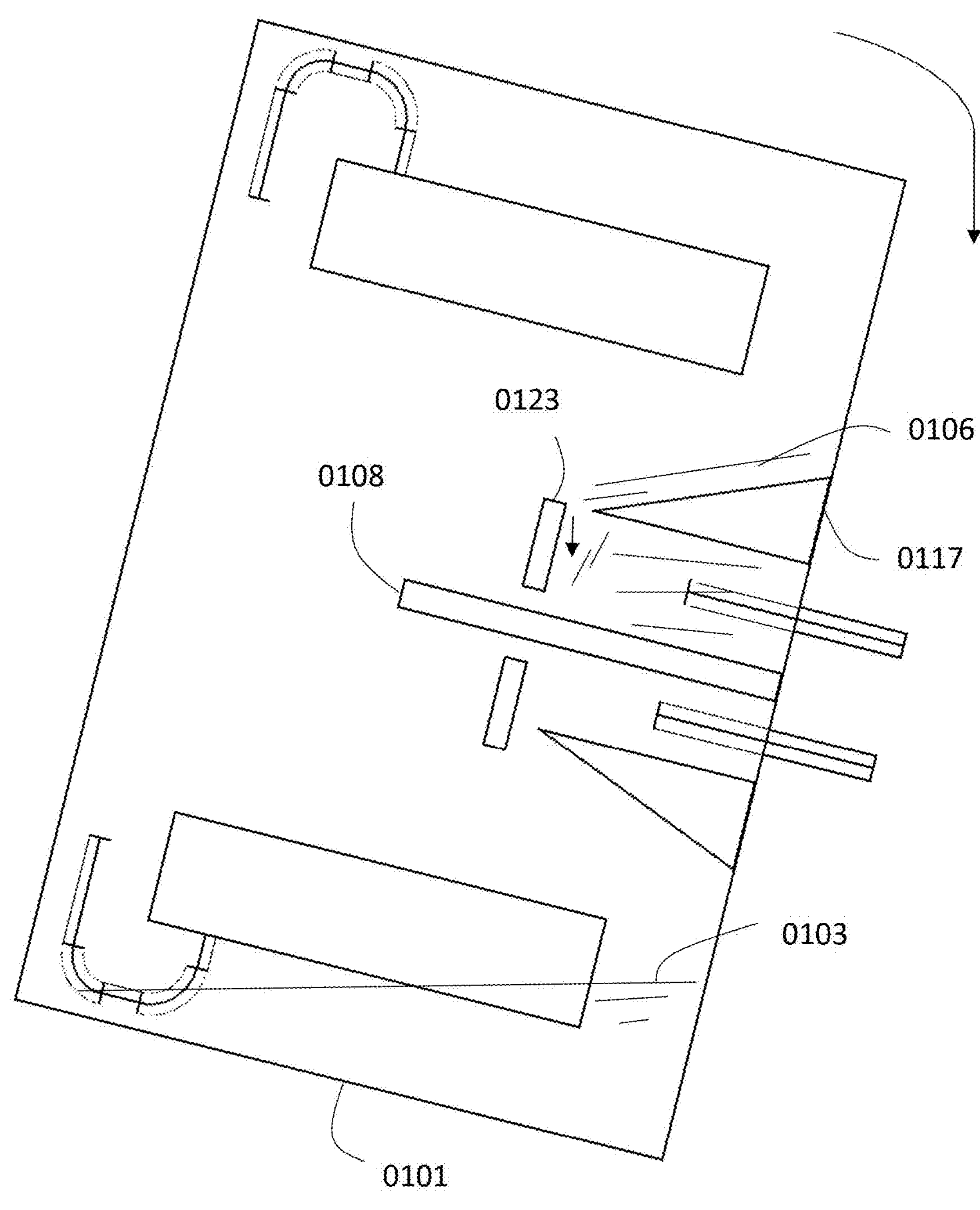
FIG. 23. is a conceptual elevation view of a cell of a system that achieves heat integration in vertical orientation, and that operates electrochemically in horizontal orientation; shown during fluid re-distribution, according to an embodiment.
Figure 24:
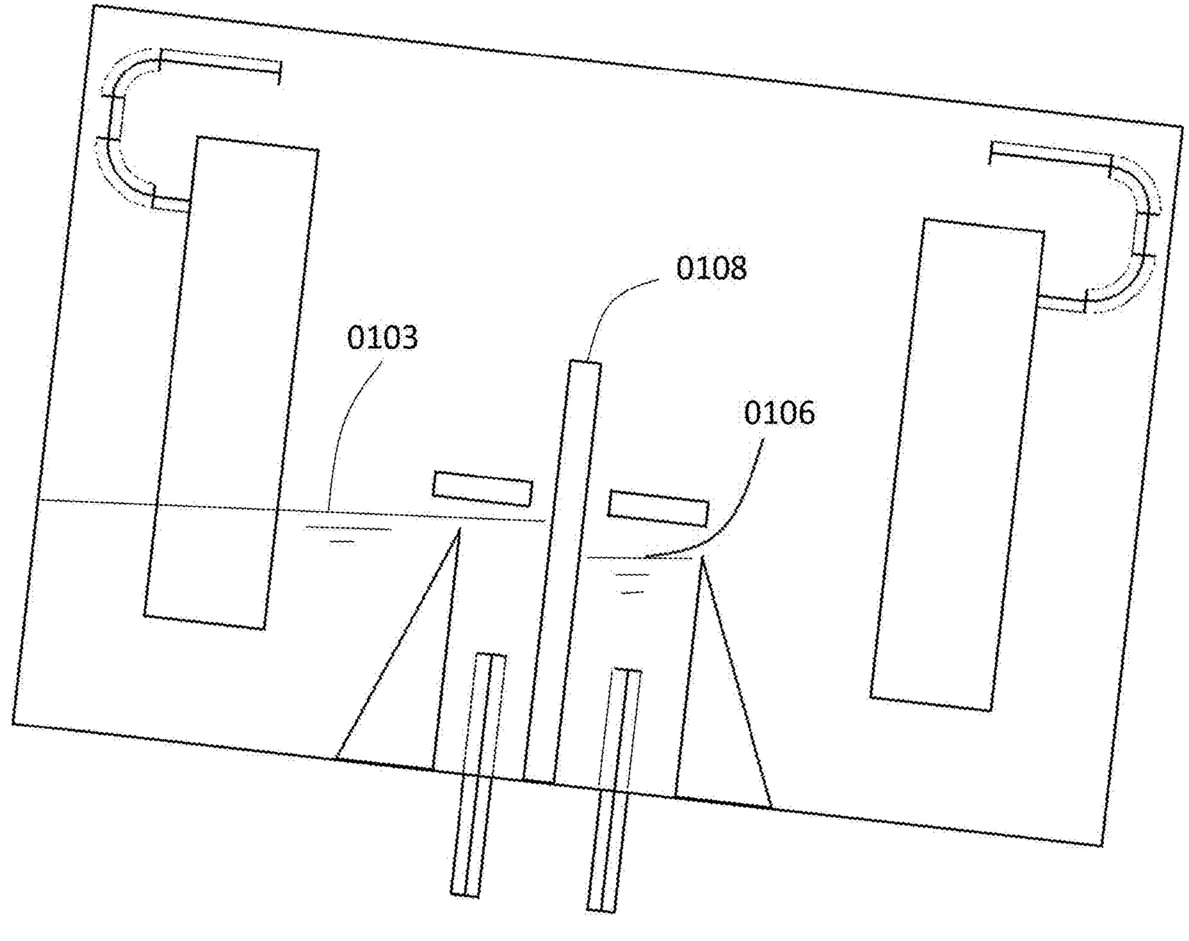
FIG. 24. is a conceptual elevation view of a cell of a system that achieves heat integration in vertical orientation, and that operates electrochemically in horizontal orientation; shown during electrochemical operation, according to an embodiment.

According to an embodiment, FIG. 20 provides an orthogonal view. FIG. 21 provides a second orthogonal review. FIG. 22 show a side/elevation view during heat application. FIG. 23 shows a side/elevation view during fluid redistribution. FIG. 24 shows a side/elevation view before electrochemical operation.

Cell 0100 includes surface 0001, surface 0101, first divider 0111, first electrolyte 0103, first electrode 0104, second divider 0112, second electrolyte 0106, second electrode 0107, ion exchange membrane 0108, first tube 0113, second tube 0114, first plate 0116, second plate 0117, first baffle 0122, second baffle 0123.

According to an embodiment, as shown in FIG. 22, heat is applied at surface 0001, which causes evaporation from second electrolyte 0106. A second tube 0114 vents vapour trapped in the inverted second divider 0112 if need be (geometry of second tube 0114 is such that the risk of siphoning during its inversion is mitigated). In some embodiments, baffles adjacent to the opening of tube 0114 may promote desired circulation. In some embodiments, the length of the portion of tube 0114 that is outside of the divider 0112 is shorter than the end of tube 0114 that is within the divider, to mitigate siphoning.

Vapour may flow according to the path of the arrows in FIG. 22; condensation may occur at surface 0101, condensate may collect as first liquid 0103 within first divider 0111. After a desired amount of condensate is formed within first divider 0111, concentration cell 0100 may be rotated in the direction indicated (counterclockwise in the view of FIG. 22) to achieve fluid re-distribution.

According to an embodiment, with reference to FIG. 23, as concentration cell 0100 is rotated, fluid re-distribution occurs, and second electrolyte 0106 flows over second plate 0117 and is directed into the volume between second plate 0117 and ion exchange membrane 0108 (according to the arrow shown in the figure), during which a second splash baffle 0123 may mitigate undesirable spillage over ion exchange membrane 0108. After the second electrolyte 0106 has been redistributed to the desired location adjacent ion exchange membrane 0108, concentration cell 0100 is rotated in the direction indicated in FIG. 23 (clockwise in the view of the figure) in preparation for electrochemical operation.

According to an embodiment, as shown in FIG. 24, electrochemical operation may occur due to the concentration imbalance between first electrolyte 0103 and second electrolyte 0106, and due to ion transfer through ion exchange membrane 0108, and thus current may pass through first electrode 01013 and second electrode 0107 in circuit with an external electrical load (not shown). According to an embodiment, a level of first electrolyte 0103 is above first plate 0116 (and thus solute concentration equalizes throughout the first electrolyte 0103, to the left and right of first plate 0116). In the embodiment of FIG. 24, the ion exchange membrane 0108 is inclined from vertical during electrochemical operation to substantially achieve equal static head (pressure) on either side of ion exchange membrane 0108 (other embodiments may vary in this regard).

In other embodiments, a variety of baffle configurations may be possible. In other embodiments, a degree of inclination (e.g.—extent of deviation from horizontal or vertical, if any) during heating, or fluid re-distribution, or electrochemical operation may vary.

Figure 25:
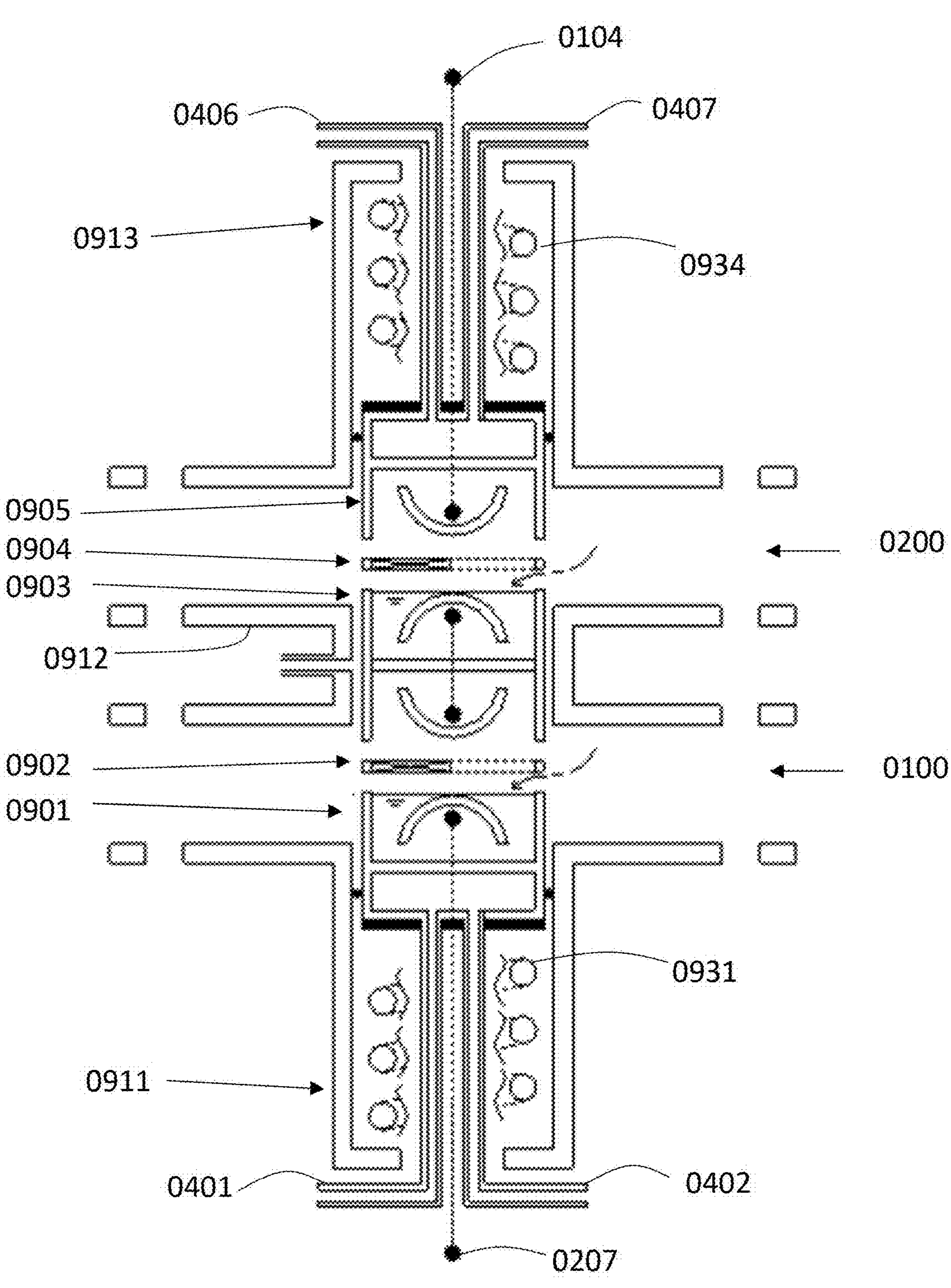
FIG. 25. is a schematic diagrammatic conceptual sectional elevation view of cells of a system which is readily assembled and disassembled; shown disassembled, according to an embodiment.
Figure 26:
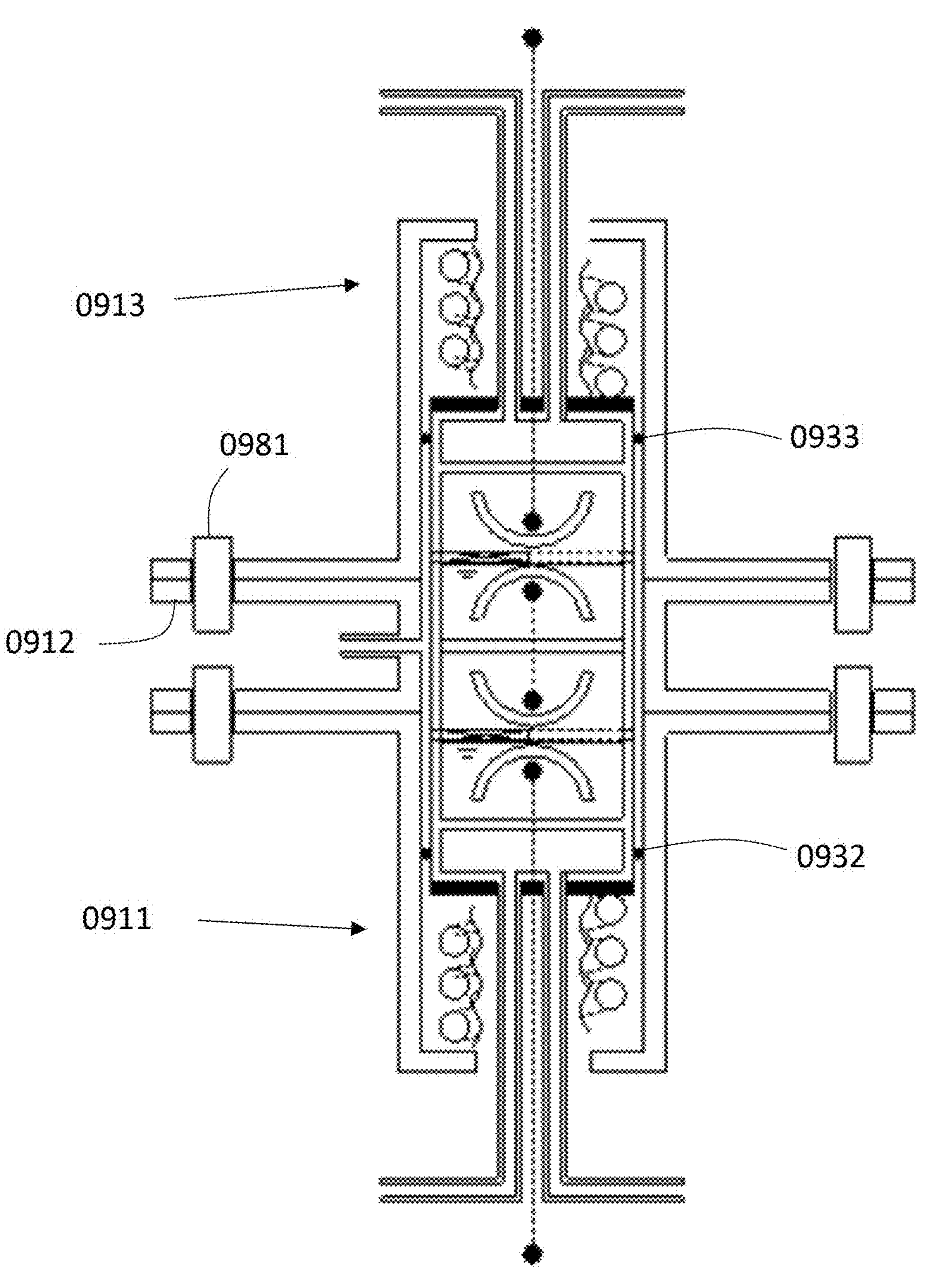
FIG. 26. is a schematic diagrammatic conceptual sectional elevation view of cells of a system which is readily assembled and disassembled; shown assembled, according to an embodiment.

According to an embodiment, as shown in FIG. 25 through 26, electrochemical device system 0011 which may be readily assembled and disassembled is described.

With reference to FIG. 25, electrochemical device system 0011 is shown disassembled, according to an embodiment. Electrochemical device system system 0011 comprises two concentration cells 0100 and 0200 (other embodiments can include more, or less) which together are comprised of cell segments 0901, 0902, 0903, 0904, and 0905. According to an embodiment, cell segment 0901 may include a heat transfer chamber and a divider of the cell 0100. Cell segment 0902 may include an ion exchange membrane of the cell 0100. Cell segment 0903 may include a divider of the cell 0100, and a divider of cell 0200. Cell segment 0904 may include an ion exchange membrane of cell 0200. Cell segment 0905 may include a divider of the cell 0200 and a heat transfer chamber. Cell segments 0901, 0902, 0903, 0904, 0905 may be pressed together, so as to achieve sealing at their mutual interfaces, by the application of a pressing force via lower head 0911 and upper head 0913.

According to an embodiment, as described in FIG. 25, lower inlet 0402 and lower outlet 0403 may be used to provide external fluid to cell segment 0901. Upper inlet 0406 and upper outlet 0407 may be used to provide external fluid to cell segment 0905. Lower electrode 0107 and upper electrode 0204 may conduct current during electrochemical operation.

When disassembled, components of the system may be immersed in, or irrigated by, a new or first addition of a mixture of electrolyte 0103 and 0106. (e.g.—to achieve a first or a new fill). By virtue of the geometry and pre-selected volume of pockets or low points related to each cell 0100 and 0200, immersion or irrigation may transfer a desired fluid volume to each concentration cell 0100 and 0200. Concentration cell 0100 components may be designed such that they retain a desired volume in each cell during immersion or irrigation. In FIG. 25, upper portions of cell segment 0901 and cell segment 0903 are shown filled with solution, which flowed thereto according to the arrows shown in the figure (during immersion or irrigation), according to an embodiment.

In some embodiments, disassembly is facilitated by having each component linked (for example by chains) to the component above, such that lifting the topmost part raises and separates all components. In some embodiments, disassembly is facilitated by designing component interface to allow a wedge(s) to be driven between adjacent components, to separate them. For example, such wedges could be integral to the system (e.g.—actuated by removal of the lid) or external.

In some embodiments, during disassembly, components may remain within an enclosure 0912, and enclosure 0912 may be used to retain fluid during immersion or irrigation for fluid (re) fill. In some embodiments, cell segments 0901, 0902, 0903, 0904, and 0905 may be removed from the enclosure 0912 and may be placed (for example) in a jig for convenient replacement of components.

With reference to FIG. 26, the electrochemical device system 0011 is shown assembled, according to an embodiment. Lower head 0911 and upper head 0913 may be joined (e.g.—with bolt 0981 and the like) to enclosure 0912. According to an embodiment, this connection, together with lower o-ring 0932 and upper o-ring 0933, may form a seal that maintains concentration cells 0100 and 0200 in an enclosed atmosphere (e.g.—vacuum atmosphere for insulation). Due to connection with enclosure 0912, lower head 0911 and upper head 0913 apply force (via lower spring 0931 and upper spring 0934 respectively) to stacked cell segments 0901, 0902, 0903, 0904, 0905 to achieve sealing between the mating surface of cell segments 0901, 0902, 0903, 0904, and 0905.

Lower o-ring 0932 and upper o-ring 0933 may be dynamic and allow sliding of components 0901 and 0905 respectively while maintaining a seal. This arrangement may accommodate thermal expansion.

Enclosure 0912 may be equipped with one or more ports 0951 (and valves) to establish a vacuum initially or periodically, evacuate periodic leakage, or provide inert blanket. In the embodiment of FIG. 26, when assembled, the enclosure 0912 may be evacuated to minimize heat loss to the surroundings. In the embodiment of FIG. 26, port 0951 may be used for this purpose.

According to an embodiment, as shown in FIG. 26, the lower head 0911 and upper head 0913 may be connected to enclosure 0912 and connection thereto imparts the clamping force. In other embodiments, the lower head 0911 and upper head 0913 are connected directly to each other (to impart a clamping or sealing force). In some embodiments, an annular vacuum cylinder or other insulation surrounds the cells 0100 and 0200 but does not connect (via tensile connection) to the heads 0911 and 0913. In some embodiments, cells 0100 or 0200 or enclosures 0912 may be cylindrical, and in others, of a square or rectangular or other profile.

Figure 27:
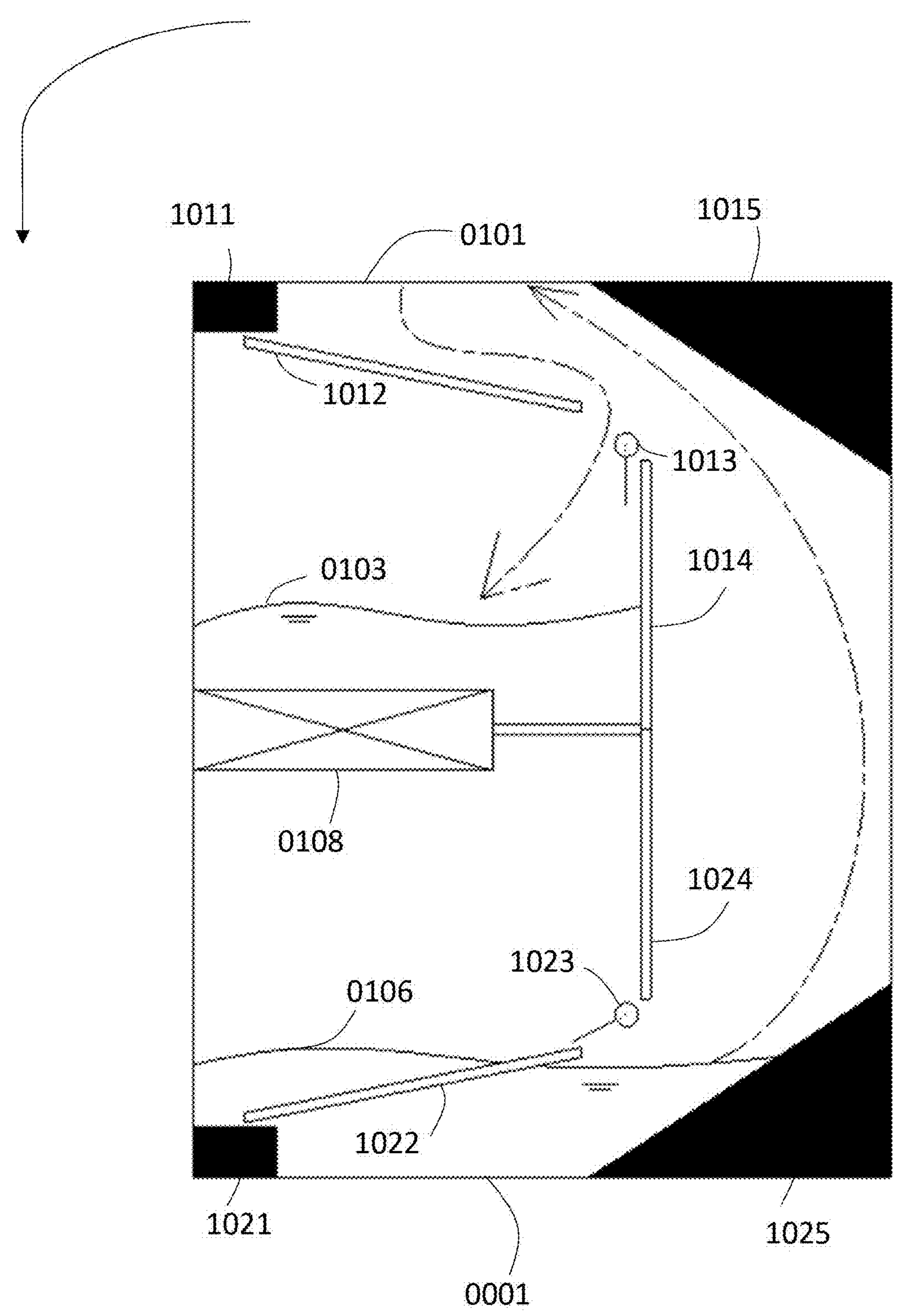
FIG. 27. is a conceptual elevation view of a cell of a system that achieves heat integration in vertical orientation, and that operates electrochemically in horizontal orientation, and wherein a surface is used both to transfer heat and to act as an electrode; shown during heating, according to an embodiment.
Figure 28:
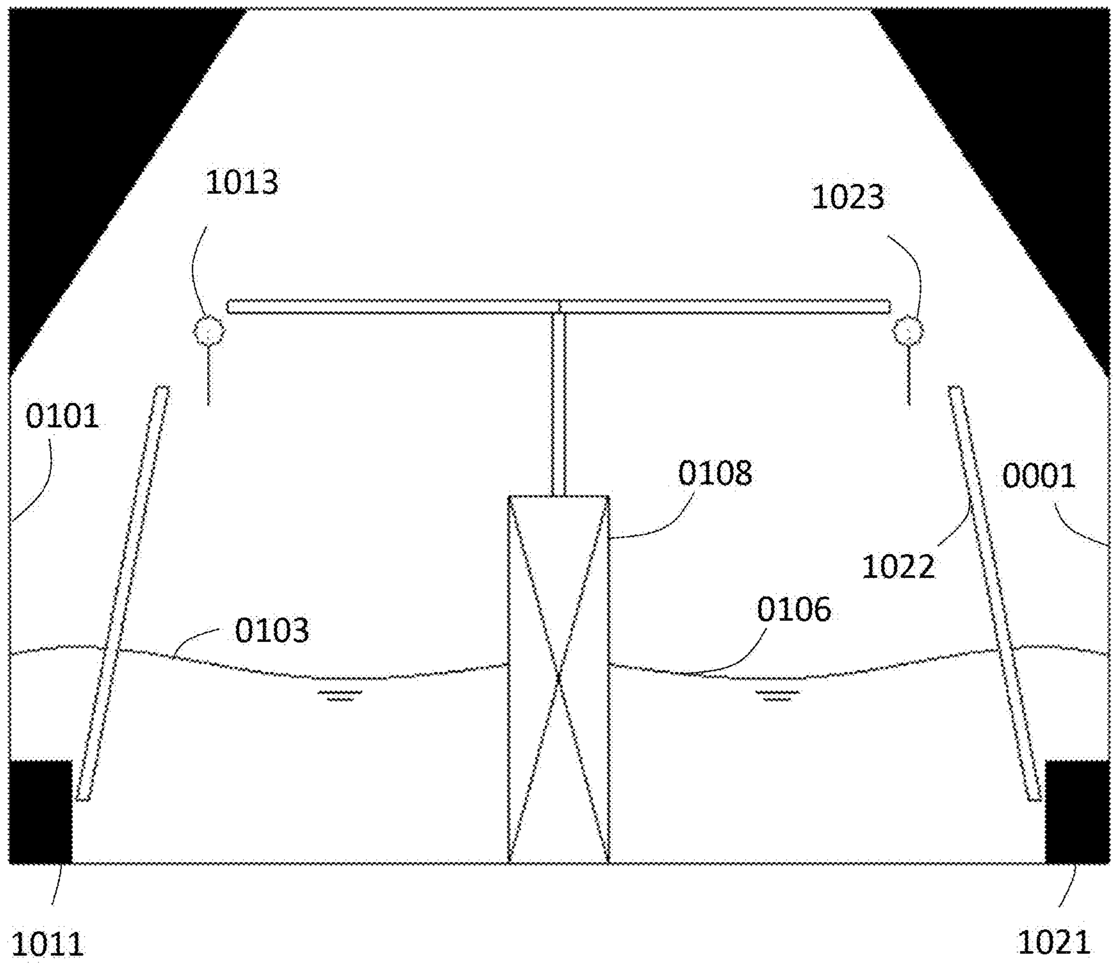
FIG. 28. is a conceptual elevation view of a cell of a system that achieves heat integration in vertical orientation, and that operates electrochemically in horizontal orientation, and wherein a surface is used both to transfer heat and to act as an electrode; shown during electrochemical operation, according to an embodiment.

According to an embodiment, as shown in FIGS. 27 through 28, a cell 0100 adjacent to a cell 0200 that achieves heat integration in vertical orientation, and that operates electrochemically in horizontal orientation, and wherein a surface 0101 common between cell 0100 and 0200 may both transfer heat and act as an electrode, is described.

FIG. 27 shows cell 0100 during the application of heat. FIG. 28 shows cell 0100 during electrochemical operation.

According to an embodiment, as shown in FIG. 27, heat is applied at surface 0001, which causes evaporation from second electrolyte 0106. Vapour and condensate may flow according to the path of the arrows in FIG. 27. Condensation may occur at surface 0101 and condensate may flow through the gap between plate 1012 and flap 1013 (which is open due to flap 1013 hanging by gravity) so as to cause an accumulation of first liquid 0103 within the collection area made by ion exchange membrane 0108 and divider 1014. After a desired amount of condensate is formed therein, concentration cell 0100 may be rotated in the direction indicated (counterclockwise in the view of FIG. 27) to achieve fluid re-distribution. In some similar embodiments, where ion exchange membrane 0108 retains liquid, it may be fabricated from a composite comprising a functional thin film and a perforated backing material, or from other materials.

According to an embodiment, as shown in FIG. 27, during heat application, vapour flow from surface 0001 may be channeled or directed as shown in FIG. 27 due to the presence of liner 1021, plate 1022, flap 1023, liner 1025, and liner 1015 and thereby energy transfer to surface 0101 may be facilitated (to facilitate heat transfer to cell 0200). Flap 1023 may attain the orientation as shown (closing a gap between divider 1024 and plate 1022) due to hinge movement about a pivot of flap 1023 by the force of gravity.

According to an embodiment as shown in FIG. 27, liner 1021, plate 1022, flap 1023, liner 1025, and liner 1015 may be fabricated to be insulating to minimize heat transfer through same, to promote heat transfer to surface 0101. A gap between liner 1021 and plate 1022 may preferentially facilitate heat transfer to surface 0101; in some embodiments such a gap may be tortuous or narrow.

In some embodiments, non-condensables may be channeled to beneath ion exchange membrane 0108 during heating (e.g.—by a tube), to facilitate the desired flow of second electrolyte 0106 and solvent vapour.

Liner 1011, plate 1012, flap 1013, liner 1015 may operate in a similar manner to that describe above (i.e.—to liner 1021, plate 1022, flap 1023, liner 1025 respectively) when cell 0100 is (later) oriented for heat application at surface 0101.

According to an embodiment, as shown in FIG. 28, electrochemical operation may occur due to the concentration imbalance between first electrolyte 0103 and second electrolyte 0106, and due to ion transfer through ion exchange membrane 0108, and due to current passing through surface 0101 to an adjacent cell 0200 (i.e.—a function typical of first electrode 0103) and due to current passing through surface 0001 to an adjacent cell which is not shown or to an external electrical load which is not shown (i.e.—a function typical of second electrode 0107).

According to an embodiment, as shown in FIG. 28, during or prior to electrochemical operation, second electrolyte 0106 may flow through the gap between liner 1021 and plate 1022 so as to allow second electrolyte 0106 to communicate with ion exchange membrane 0108.

The following are general comments related to the invention.

In some embodiments, a stack of cells 0100 and 0200 may be joined directly or indirectly by being welded, swaged, glued, brazed, threaded together, flanged, compression fit, pressed together, or placed in contact.

In some embodiments, cylindrical electrodes 0104 and 0107 are employed. In some embodiments, other electrode shapes may be used (e.g.—prism, grid, mesh, plate, wire, dish, cup or other). In some embodiments, within cell 0100, dividers 0111 or 0112, or baffles 0122 or 0123, or surface 0001 or surface 0101 can serve as electrodes 0104 or 0107 or additional electrode surfaces extending the active surface of electrodes 0104 or 0107.

In some embodiments, electrolyte distribution can be achieved, at least in part, by one of the following methods: inflation of an inflatable chamber within a divider so as to displace liquid from the divider, dipping an object into the liquid within a divider so as to displace liquid from the divider, squeezing flexible elements of a divider so as to reduce the volume within the divider so as to displace liquid from the divider, dipping an object by magnetic actuator into the liquid within a divider so as to displace liquid from the divider, squeezing flexible elements of a divider so as to reduce the volume within the divider so as to displace liquid from the divider, rapidly jolting cell components downwards so as to force liquid up and out of a divider and then moving cell components laterally so as to direct such liquid to a new location, circulating non condensable gas into a divider so as to displace liquid from the divider pneumatically, by bubbling, siphoning, siphoning induced by cell movement.

In some embodiments, baffles within the cell (independent from the dividers adjacent to electrodes) can be rotated independently so as to direct vapour and condensate desirably (and to minimize re-vapourization). In some such embodiments, the dividers or baffles can be rotated by magnetic actuator (which avoids protrusions through the cell or column wall).

In some embodiments that employ stacked cells 0100 that are thermally integrated in a column 0400, it may be desirable to reduce longitudinal conduction along the column 0400 wall to ensure that heat transfer between cells is primarily by vapourization, condensation or a combination of vapourization and condensation. Some techniques for reducing conduction may include but are not limited to: appropriate selection of non-conductive wall material, reduction of column wall cross section, implementation of internal fins, and application of insulation or liners to interior of column walls.

In some embodiments, condensate collecting divider(s) rotate relative to envelope 0013. In some such embodiments, during rotation of the cell, a lifter component fixed to the cell wall engages a tab on the divider, causing the divider to rotate until inverted, spilling its contents in the process. Once inverted, the divider may disengage from the lifter component (for example, due to gravity) and rotates to an upright position again (for example, to achieve balance) in preparation for the next cycle of condensate collection.

In some embodiments, liquids within the column 0400 remain as near as feasible to the boiling temperature between cycles, so as to preserve the energy therein contained as sensible heat.

In various embodiments, ion transfer between the first chamber 0102 (e.g.—anode chamber) and second chamber 0105 (e.g.—cathode chamber) is achieved via an ion exchange membrane 0108. In some embodiments, ion transfer between the first chamber 0102 and second chamber 0105 is achieved via a salt bridge. Both ion exchange membranes 0108 and salt bridges transfer ions and may be referred to collectively as ion transferers.

In various embodiments, an external electrical source (not shown) may apply potential to the first electrode 0104 or second electrode 0107 of concentration cell 0100 to adjust solution chemistry, electrode weights, etc.

In various embodiments, generally, an initial liquid fill may be added to concentration cell 0100 to provide sufficient liquid to wet ion exchange membrane 0108 (also referred to as the ion transferer).

In some embodiments, the first divider 0111 liquid retaining volume may be selected so as to collect a desired amount of first electrolyte 0103 when full. In such embodiments, overflow of the first divider 0111 returns solvent (not shown) to the second divider 0112, and in so doing, automatically avoids removing too much liquid from second divider 0112.

In some embodiments, an initial mixture of first electrolyte 0103 and second electrolyte 0107 added to concentration cell 0100 may be selected to meet none or some or all of the following criteria, comprising:

(a) the initial fill mixture (0103 and 0107) is less than the following volume sum calculation, as measured when the cell is in the position for generation of vapour and delivery of condensate to the first divider:

(cell volume)−(first divider volume)−(total unoccupied space above the lip or rim of the first divider).

(b) a series of volume calculations are made for those positions or orientations of the cell that are achieved during the preparation of the second divider for a new receipt of condensate by the process of electrolyte redistribution wherein the second divider is in a position capable of retaining liquid wherein the second divider is within the latter range of positions achieved during electrolyte distribution that are between the final position and a position in which the second divider does not retain liquid. The initial fill mixture (0103 and 0107) of the cell shall be less than the minimum value obtained by the series of volume calculations. The volume calculation made in each position or orientation applicable to the series of volume calculations is as follows:

(cell volume)−(total liquid retaining capacity of the second divider in the particular position or orientation)−(total unoccupied space above the lip or rim of that portion of the second divider which is capable of retaining liquid in the particular position or orientation).

(c) the initial fill mixture (0103 and 0107) is greater than the following volume sum calculation, as measured when the cell is in the position for electrochemical operation:

(minimum liquid accumulation adjacent to a first side of the membrane that would be required to wet the first side of the membrane)+(minimum liquid accumulation adjacent to a second side of the membrane that would be required to wet the second side of the membrane).

In some embodiments, a backing material for electrodes 0104 and 0107 may be used (e.g.—which may avoid complete disintegration of the electrode 0104 or 0107 in a certain operating scenario). Backing material may include materials that resist dissolution or reaction sufficiently under the conditions of the cell 0100, and may include, depending on the embodiment and conditions, without limitation: graphite, stainless steel, duplex stainless steel, super duplex stainless steel, monel, silicon, amorphous carbon, monolithic materials, lined materials, or other materials.

In some embodiments the solvent of first electrolyte 0103 or second electrolyte 0106 may be water. In other embodiments other solvents may be used including, without limitation: organic solvent, alcohol, acetone, amine, ammonia, DMSO, DMF, or other materials.

In some embodiments, column 0400 or surface 0101 or spacers or plates or other materials that may be common to cells 0100 and cell 0200 (or between them) may be fabricated from electrically non-conductive material (for example, to avoid electrolytic activity thereupon). In some embodiments, materials common to cells 0100 and cell 0200 (e.g.—surface 0101) may be fabricated from electrically conductive material (for example, to facilitate electrolysis activity thereupon).

Specific embodiments of the present invention have been disclosed; however, several variations of the disclosed embodiments could be envisioned as within the scope of this invention. It is to be understood that the present invention is not limited to the embodiments described above but encompasses any and all embodiments within the scope of the following claims.

Various embodiments of the invention have been described in detail. Since changes in and or additions to the above-described best mode may be made without departing from the nature, spirit or scope of the invention, the invention is not to be limited to those details but only by the appended claims. Section headings herein are provided as organizational cues. These headings shall not limit or characterize the invention set out in the appended claims.

What is claimed is:

1. A method of using an electrochemical device system, comprising:

pouring a solution including at least a solvent into the electrochemical device system such that it settles at a bottom of the electrochemical device system;

applying heat to a bottom surface of a first side of the electrochemical device system such that a heated solution is generated;

evaporating the solvent such that it moves up to a top surface of the electrochemical device system;

condensing the solvent at the top surface such that it drips downwards as a condensed solvent;

collecting the condensed solvent between a divider and the top surface of the electrochemical device system;

causing the condensed solvent and the heated solution to be in contact with a first side and second side of an ion transferer, respectively;

extracting electrical energy by connecting an external load to electrodes on both sides of an ion transferer, before, during or after heat transfer occurs;

subsequently operating the electrochemical device system such that functions of electrodes on either side of the ion transferer are reversed.

2. The method of claim 1, wherein temperature is monitored and evaporation is stopped after a temperature threshold is reached.

3. The method of claim 1, wherein electrochemical device system current is monitored and electrochemical device system operation is stepped after a current threshold is reached.

4. The method of claim 1, wherein, during or after the solvent is evaporated such that it moves up to the top surface of the electrochemical device system, heat energy from the solvent is transferred such that it heats a first side of a second electrochemical device system and causes evaporation of solvent in a first side of the second electrochemical device system.

5. An electrochemical device system, comprising:

a concentration cell encapsulating at least:

an electrolytic solution including at least a solvent;

two electrodes; and an ion transferer disposed between the two electrodes such that a first compartment and a second compartment are formed within the concentration cell:

wherein the solvent is vapourized and condensed within the concentration cell to generate two solutions of differing electrochemical potential for galvanic cell operation and wherein in a first cycle the first compartment is a cathode compartment while the second compartment is an anode compartment and wherein in a second cycle the second compartment is a cathode compartment while the first compartment is an anode compartment.

6. The electrochemical device system of claim 5, wherein condensate collected on a surface flows to a sloped portion of the surface and therefrom drips into a compartment of the cell.

7. The electrochemical device system of claim 5, wherein the electrolytic solution is sealed within the concentration cell and is not transferred externally.

8. The electrochemical device system of claim 5, wherein a total mass of initial fill of the concentration cell is regulated to achieve a target pressure.

9. The electrochemical device system of claim 5, wherein a non-condensable gas is added to the concentration cell.

10. The electrochemical device system of claim 5, wherein an initial minimum quantity of the electrolytic solution in the concentration cell is such that both sides of the ion transferer are contacted by the electrolytic solution when the electrochemical device system is in a position for electrochemical operation.

11. The electrochemical device system of claim 5, wherein the electrolytic solution within the concentration cell can be redistributed within the concentration cell.

12. The electrochemical device system of claim 5, wherein the concentration cell is movable to redistribute the electrolytic solution within the concentration cell.

13. The electrochemical device system of claim 5, wherein an envelope of the concentration cell is stationary and at least one element of the concentration cell is rotatable to redistribute the electrolytic solution within the concentration cell.

14. The electrochemical device system of claim 5, wherein the concentration cell undergoes heating and electrochemical operation in different positions.

15. The electrochemical device system of claim 5, wherein a stack including the concentration cell is compressed to achieve sealing between stacked components.

16. An electrochemical device system, comprising:

a concentration cell comprising at least:

an electrolytic solution including at least a solvent;

a first electrode;

a second electrode;

and an ion transferer disposed between the first and second electrodes;

wherein in a first cycle the solvent is vapourized and condensed to generate two solutions of differing electrochemical potential which are directed to a first side and second side of the ion transferer respectively and the first electrode is a cathode while the second electrode is an anode, and wherein in a second cycle the solvent is vapourized and condensed to generate two solutions of differing electrochemical potential which are directed to a first side and second side of the ion transferer respectively and the first electrode is an anode while the second electrode is a cathode.

17. An electrochemical device system, comprising:

a concentration cell comprising at least:

an electrolytic solution including at least a solvent;

a first electrode;

a second electrode;

and an ion transferer disposed between the first and second electrodes;

wherein the solvent is vapourized and condensed to generate two solutions of differing electrochemical potential which are directed to a first side and second side of the ion transferer respectively, and wherein in a first cycle the first electrode loses mass while the second electrode gains mass, and wherein in a second cycle the second electrode gains mass while the second electrode loses mass.

18. An electrochemical device system, comprising:

at least one concentration cell comprising at least:

an electrolytic solution including at least a solvent;

a first electrode;

and a second electrode;

wherein the solvent is vapourized and condensed to generate two solutions of differing electrochemical potential for use in the concentration cell, and wherein in a first cycle the first electrode is a cathode while the second electrode is an anode, and wherein in a second cycle the first electrode is an anode while the second electrode is a cathode.

19. The electrochemical device system of claim 18 comprising at least two concentration cells that exchange heat with each other.

* * * * *